(12) United States Patent
Ang et al.

(10) Patent No.: US 12,109,563 B2
(45) Date of Patent: Oct. 8, 2024

(54) TEST CARTRIDGE FOR ANALYSIS INSTRUMENTS

(71) Applicant: ILLUMINA SINGAPORE PTE. LTD., Singapore (SG)

(72) Inventors: Beng Keong Ang, Singapore (SG); Shyun Long Wang, Singapore (SG); Heng Kuang Cheng, Singapore (SG); Chow Jin Chng, Singapore (SG); Ai Wee Lee, Singapore (SG); Yashwanth Panduga, Singapore (SG)

(73) Assignee: Illumina Singapore Pte. Ltd., Singapore (SG)

( * ) Notice: Subject to any disclaimer, the term of this patent is extended or adjusted under 35 U.S.C. 154(b) by 517 days.

(21) Appl. No.: 17/309,918

(22) PCT Filed: Sep. 29, 2020

(86) PCT No.: PCT/SG2020/050548
§ 371 (c)(1),
(2) Date: Jun. 29, 2021

(87) PCT Pub. No.: WO2021/066744
PCT Pub. Date: Apr. 8, 2021

(65) Prior Publication Data
US 2022/0072543 A1 Mar. 10, 2022

Related U.S. Application Data

(60) Provisional application No. 62/908,511, filed on Sep. 30, 2019.

(51) Int. Cl.
*B01L 3/00* (2006.01)
*B01L 7/00* (2006.01)
*G01N 35/10* (2006.01)

(52) U.S. Cl.
CPC .......... *B01L 3/502738* (2013.01); *B01L 7/00* (2013.01); *G01N 35/1097* (2013.01); *B01L 2300/0663* (2013.01); *B01L 2400/0644* (2013.01)

(58) Field of Classification Search
CPC .......... G01N 35/1097; B01L 2200/146; B01L 2200/147; B01L 2300/0627;
(Continued)

(56) References Cited

U.S. PATENT DOCUMENTS

| 9,127,313 B2 | 9/2015 | Brown et al. |
| 9,404,881 B2 | 8/2016 | Glezer et al. |

(Continued)

FOREIGN PATENT DOCUMENTS

| JP | 2006517652 A | 7/2006 |
| JP | 2009521682 A | 6/2009 |

(Continued)

OTHER PUBLICATIONS

International Search Report and Written Opinion mailed Jan. 8, 2021, in PCT/SG2020/050548.
(Continued)

*Primary Examiner* — Jennifer Wecker
(74) *Attorney, Agent, or Firm* — Weaver Austin Villeneuve & Sampson LLP

(57) ABSTRACT

A test cartridge for insertion into an analysis instrument having an actuation mechanism, the test cartridge having one or more sensors for measuring an aspect of the actuation mechanism.

33 Claims, 10 Drawing Sheets

(58) Field of Classification Search
CPC ......... B01L 2300/0663; B01L 2300/18; B01L 2400/0478; B01L 2400/0487; B01L 2400/0644; B01L 3/502715; B01L 3/502738; B01L 7/00
See application file for complete search history.

(56) References Cited

U.S. PATENT DOCUMENTS

| | | |
|---|---|---|
| 2006/0195047 A1 | 8/2006 | Freeman et al. |
| 2008/0212643 A1 | 9/2008 | McGahhey et al. |
| 2013/0323126 A1 | 12/2013 | Padmanabhan et al. |
| 2018/0117587 A1* | 5/2018 | Lemoine ........... B01L 3/502715 |
| 2019/0056307 A1 | 2/2019 | Bugg et al. |
| 2019/0317116 A1 | 10/2019 | Phelan et al. |

FOREIGN PATENT DOCUMENTS

| | | |
|---|---|---|
| JP | 2013512447 A | 4/2013 |
| JP | 2014097080 A | 5/2014 |
| JP | 2017521061 A | 8/2017 |
| KR | 10-2017-0033295 | 3/2017 |
| WO | 2017037072 A1 | 3/2017 |
| WO | WO-2017127570 A1 | 7/2017 |

OTHER PUBLICATIONS

EP Extended European Search report dated Oct. 2, 2023, in EP Application No. 20871819.7.
International Preliminary Report on Patentability dated Apr. 14, 2022, in PCT Application No. PCT/SG2020/050548.

\* cited by examiner

TEST CARTRIDGE FOR ANALYSIS INSTRUMENTS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Various analysis instruments, such as genomic sequencing systems, may utilize a cartridge-based framework in which various elements used during analysis are provided in one or more removable cartridges, e.g., a flowcell cartridge, a reagent cartridge, and/or a wash cartridge. Analysis instruments may include various systems designed to interact with the analysis cartridges.

SUMMARY

Details of one or more implementations of the subject matter described in this specification are set forth in the accompanying drawings and the description below. Other features, aspects, and advantages will become apparent from the description, the drawings, and the claims. The following, non-limiting implementations are considered part of the disclosure; other implementations will be evident from the entirety of this disclosure and the accompanying drawings as well.

Test cartridges may contain one or more sensors for measuring and determining the functionality of an analysis instrument as it relates to actuating systems for analysis cartridges. The test cartridge may include one or more linear translation sensors to measure the linear movement of and/or the force applied by the analysis instrument's linear actuation feature(s), such as may be used in a piercing mechanism, a pump actuation mechanism, and/or a valve actuation mechanism. The test cartridge may also or alternatively include an angular rotation sensor or sensors to measure the angular rotation and/or the torque caused by the analysis instrument's rotational actuation systems. In some instances, the test cartridge may alternatively or additionally include miniature load cells for measuring a linearly applied force provided by the analysis instrument, as well as, in some cases, a temperature sensor for measuring the performance of a heating element of the analysis instrument.

These sensors may be positioned within test cartridges and arranged to simulate various functionalities of systems within the analysis cartridges. This may allow for an analysis instrument to engage with the test cartridge in generally the same manner as it does with an analysis cartridge. For example, the test cartridge may have angular rotation sensors with external splined shafts that have at least some of the same external features as the analysis cartridge's splined shafts and that are positioned within the test cartridge such that when the test cartridge is inserted into and positioned within in the analysis instrument, these splined shafts are in the same positions with respect to the analysis instrument as their counterparts in an actual analysis cartridge would be. These angular rotation sensors may also simulate the operation of the rotary valves in an analysis cartridge, including the resistance exerted by such valves to the analysis instrument's rotary valve drive mechanism. Similarly, the linear translation sensors to test the foil pierce mechanism may have features that are similar to an analysis cartridge, such as providing contact points for the engagement pins in the same locations as on the foil puncture disk, and may simulate the functionality of the analysis cartridge including the resistance exerted by a foil seal during puncturing by the puncture disk. In some implementations, additional sensors may also simulate the positioning and functionality of an analysis cartridge's features so that the analysis instrument may engage with multiple aspects of the test cartridge.

In some implementations, a test cartridge for insertion into an analysis instrument having a linear actuation mechanism, a rotational actuation mechanism, a heater, a pump actuation mechanism, a second linear actuation mechanism, and a cartridge receiver, may be provided. The test cartridge may include a test cartridge housing having a form factor to be received by the cartridge receiver of the analysis instrument, a plurality of first linear translation sensors, each first linear translation sensor having first detector and a corresponding first movable element linearly translatable along a first axis, where at least a first portion of each of the plurality of first linear translation sensors is positioned within the test cartridge housing such that the corresponding first movable element thereof is to engage with the linear actuation mechanism of the analysis instrument when the test cartridge is inserted into the analysis instrument and the linear actuation mechanism of the analysis instrument is actuated, and where each first detector of each of the plurality of first linear translation sensors is to detect a first distance moved by the corresponding first movable element along the first axis relative to the test cartridge housing responsive to a linear input provided by the linear actuation mechanism of the analysis instrument when the test cartridge is inserted into the analysis instrument and the linear actuation mechanism of the analysis instrument is actuated, a second linear translation sensor having a second detector and a second movable element linearly translatable along a second axis, where at least a second portion of the second linear translation sensor is positioned within the test cartridge housing such that the second movable element is to engage with the pump actuation mechanism of the analysis instrument when the test cartridge is inserted into the analysis instrument and the pump actuation mechanism of the analysis instrument is actuated, and where the second detector is to detect a second distance moved by the second movable element along the second axis relative to the test cartridge housing when the test cartridge is inserted into the analysis instrument and the pump actuation mechanism of the analysis instrument is actuated, an angular rotation sensor having a third detector and a rotatable element rotatable about a third axis, where the angular rotation sensor is positioned within the test cartridge housing such that the rotatable element is to engage with the rotational actuation mechanism of the analysis instrument when the test cartridge is inserted into the analysis instrument and the rotational actuation mechanism of the analysis instrument is actuated, and where the third detector is to detect an angle moved by the rotatable element about the third axis relative to the test cartridge housing when the test cartridge is inserted into the analysis instrument and the rotational actuation mechanism of the analysis instrument is actuated, a temperature sensor having a receptacle in the test cartridge housing and a temperature detector positioned within the receptacle, where the temperature sensor is positioned within the test cartridge housing such that the receptacle is to engage with the heater of the analysis instrument when the test cartridge is inserted into the analysis instrument, and where the temperature detector is to detect a temperature inside the receptacle when the test cartridge is inserted into the analysis instrument, and a plurality of load cells, each of the plurality of load cells is positioned within the test cartridge housing such that each load cell is to engage with a second linear actuation mechanism when the test cartridge is inserted into the analysis instrument and the second linear actuation mechanism of the analysis instrument is actuated, and where each of the plurality of load cells is to detect a force applied to the respective load cell when the test cartridge is inserted into the analysis instrument and the second linear actuation mechanism of the analysis instrument is actuated.

In some implementations, the test cartridge may further include a controller having one or more processors and one or more memory devices, where the controller is communicatively connected with each first detector each of the plurality of first linear translation sensors, the second detector of the second linear translation sensor, the third detector of the angular rotation sensor, the temperature detector of the temperature sensor, and each of the plurality of load cells, and the controller is to receive and store data generated by each first detector, the second detector, the third detector, the temperature sensor, and each of the plurality of load cells.

In any of the foregoing implementations, the test cartridge may further include a communications interface to transmit data generated by each of the plurality of first linear translation sensors, the second linear translation sensor, the angular rotation sensor, the temperature sensor, and the plurality of load cells to an external device.

In any of the foregoing implementations, the external device may be the analysis instrument.

In any of the foregoing implementations, the controller may be to cause the transmission of updated movement data to the analysis instrument, and the updated movement data may be based, at least in part, on one or more of data generated by one or more of the first detectors, the second detector, the third detector, the temperature sensor, and each of the plurality of load cells.

In any of the foregoing implementations, the controller may be to cause the transmission of the data generated by the first detectors, the second detector, the third detector, the temperature sensor, and each of the plurality of load cells to the analysis instrument, and the analysis instrument may be to issue a notification based, at least in part, on the data generated by the first detectors, the second detector, the third detector, the temperature sensor, and each of the plurality of load cells.

In any of the foregoing implementations, each of the plurality of first linear translation sensors may further include a first resistive element to apply a first resistive force against the first movable element along the first axis, and the angular rotation sensor may further include a second resistive element to apply a second resistive force against the rotatable element.

In any of the foregoing implementations, the angular rotation sensor may further include a friction element to contact and apply a frictional resistance force against the rotatable element, the angular rotation sensor may further include a resistive element positioned such that the friction element is interposed between the resistive element and the rotatable element, and the resistive element may be to apply a force to the friction element along the third axis and in a direction towards the rotatable element.

In any of the foregoing implementations, the test cartridge may further include a second angular rotation sensor having a second angular detector and a second rotatable element rotatable about a second rotation axis, where the second angular rotation sensor is positioned such that the second rotatable element is to engage with the rotational actuation mechanism of the analysis instrument when the test cartridge is inserted into the analysis instrument and the pump actuation mechanism of the analysis instrument is actuated, and where the second angular detector is to detect a second angle moved by the second rotatable element about the second rotation axis relative to the test cartridge housing when the test cartridge is inserted into the analysis instrument and the pump actuation mechanism of the analysis instrument is actuated.

In some implementations, a test cartridge for insertion into an analysis instrument having a linear actuation mechanism and a cartridge receiver may be provided. The test cartridge may include a test cartridge housing having a form factor to be received by the cartridge receiver of the analysis instrument, and a plurality of linear translation sensors, each of the linear translation sensors having a first detector and a corresponding first movable element linearly translatable along a first axis, where at least a portion of each of the linear translation sensors is positioned within the test cartridge housing of the test cartridge such that the corresponding first movable element thereof is to engage with the linear actuation mechanism of the analysis instrument when the test cartridge is inserted into the analysis instrument and the linear actuation mechanism of the analysis instrument is actuated, and each detector is to detect a distance moved by the corresponding first movable element along the corresponding first axis relative to the test cartridge housing when the test cartridge is inserted into the analysis instrument and the linear actuation mechanism of the analysis instrument is actuated.

In any of the foregoing implementations, each linear translation sensor may further include a resistive element to apply a resistive force against the first movable element along the first axis in a first direction.

In any of the foregoing implementations, the resistive element may be a compression spring.

In any of the foregoing implementations, each linear translation sensor may further include a contact portion to be contacted by an engagement pin of the linear actuation mechanism.

In any of the foregoing implementations, each movable element may include an encoder strip, and each detector may be an optical sensor to detect a movement of the encoder strip included in the corresponding movable element.

In any of the foregoing implementations, the test cartridge may further include a controller having one or more processors and one or more memory devices, where the controller is communicatively connected with each first detector of each of the one or more linear translation sensors, and the controller is to receive and store data generated by each first detector of each of the linear translation sensors.

In any of the foregoing implementations, the test cartridge may further include a communications interface to transmit data generated by each of the one or more first linear translation sensors.

In any of the foregoing implementations, the communications interface may be to transmit data generated by each of the one or more first linear translation sensors to the analysis instrument, the controller is to cause the transmission of calibration data to the analysis instrument, and the calibration data may be based, at least in part, data generated by one or more first linear translation sensors of the analysis instrument.

In some implementations a test cartridge for insertion into an analysis instrument having a pump actuation mechanism and a cartridge receiver may be provided. The test cartridge may include a test cartridge housing having a form factor to be received by the cartridge receiver of the analysis instrument, a first hole and a second hole opposite the first hole, the second hole to receive a portion of the pump actuation mechanism of the analysis instrument, and a linear translation sensor having a detector and a movable element linearly translatable along a first axis, where at least a portion of the movable element is positioned within the test cartridge housing of the test cartridge, the movable element is positioned in between the first hole and the second hole, the movable element is to engage with and is movable by the portion of the pump actuation mechanism inserted through the second hole when the test cartridge is inserted into the analysis instrument and the pump actuation mechanism of the analysis instrument is actuated and, while being moved by the pump actuation mechanism when the test cartridge is inserted into the analysis instrument and the pump actuation mechanism of the analysis instrument is actuated, the movable element is movable through the first hole, and the detector is to detect a distance moved by the movable element along the first axis relative to the test cartridge housing.

In any of the foregoing implementations, the test cartridge may further include a controller having one or more processors and one or more memory devices, where the controller is communicatively connected with the detector of the linear translation sensor, and the controller is to receive and store data generated by the detector of the linear translation sensor.

In any of the foregoing implementations, the test cartridge may further include a communications interface to transmit data generated by the linear translation sensor.

In some implementations a test cartridge for insertion into an analysis instrument having a rotational actuation mechanism, a heater, and a cartridge receiver may be provided. The test cartridge may include a test cartridge housing having a form factor to be received by the cartridge receiver of the analysis instrument and a port to receive the heater of the analysis instrument, a first angular rotation sensor having a first detector and a first rotatable element rotatable about a first rotation axis, the first angular rotation sensor is positioned within the test cartridge housing such that the first rotatable element is to engage with the rotational actuation mechanism of the analysis instrument when the test cartridge is inserted into the analysis instrument and the rotational actuation mechanism of the analysis instrument is actuated, and wherein the first detector is to detect a first angle moved by the first rotatable element about the first rotation axis relative to the test cartridge housing when the test cartridge is inserted into the analysis instrument and the rotational actuation mechanism of the analysis instrument is actuated, and a temperature sensor having a receptacle in the test cartridge housing and a temperature detector positioned within the receptacle, wherein the temperature sensor is positioned within the test cartridge housing such that the receptacle is to engage with the heater of the analysis instrument when the test cartridge is inserted into the analysis instrument, wherein the receptacle is to be heated by the heater of the analysis instrument, and wherein the temperature detector is to detect a temperature inside the receptacle.

In any of the foregoing implementations, the test cartridge may further include a second angular rotation sensor having a second detector and a second rotatable element rotatable about a second rotation axis, wherein the second angular rotation sensor is positioned within the test cartridge housing such that the second rotatable element is to engage with the rotational actuation mechanism of the analysis instrument when the test cartridge is inserted into the analysis instrument and the rotational actuation mechanism of the analysis instrument is actuated, and wherein the second detector is to detect a second angle moved by the second rotatable element about the second rotation axis relative to the test cartridge housing when the test cartridge is inserted into the analysis instrument and the rotational actuation mechanism of the analysis instrument is actuated.

In any of the foregoing implementations, the first rotation axis and second rotation axis may be parallel to each other.

In any of the foregoing implementations, the rotatable element may include a shaft and features to engage with the rotational actuation mechanism of the analysis instrument.

In any of the foregoing implementations, the first angular rotation sensor may further include an encoder disk having a disk center axis that is collinear with a center axis of the rotatable element and the first axis, and the first detector may be an optical sensor to detect a movement of encoder disk.

In any of the foregoing implementations, the first angular rotation sensor may further include a resistive element to apply a resistive force against the rotatable element.

In any of the foregoing implementations, the first angular rotation sensor may further include a friction element to contact and apply a frictional resistance force against the rotatable element.

In any of the foregoing implementations, the first angular rotation sensor may further include a resistive element positioned such that the friction element is interposed between the resistive element and the first rotatable element, and the resistive element may be to apply a force to the friction element along the rotation axis in a direction towards the rotatable element.

In any of the foregoing implementations, the receptacle may be comprised of a metal.

In any of the foregoing implementations, the receptacle may be to be contacted by the heater inserted through the port.

In any of the foregoing implementations, the receptacle may further include a heating collar around the receptacle, and the heating collar may be to be contacted by the heater inserted through the port.

In any of the foregoing implementations, the test cartridge may further include a torque sensor to measure a torque applied to the rotatable element.

In any of the foregoing implementations, the test cartridge may further include a controller having one or more processors and one or more memory devices, where the controller is communicatively connected with the first detector and the temperature detector, and the controller is to receive and store data generated by the first detector and the temperature detector.

In any of the foregoing implementations, the test cartridge may further include a communications interface to transmit data generated by the first angular rotation sensor and the temperature sensor.

In any of the foregoing implementations, the communications interface may be to transmit data generated by the first angular rotation sensor and the temperature sensor, the controller may be to cause the transmission of data generated by the first angular rotation sensor and the temperature sensor to the analysis instrument, and the analysis instrument may be to issue a notification based, at least in part, on data generated by one or more of the first angular rotation sensor and the temperature sensor.

BRIEF DESCRIPTION OF THE DRAWINGS

The various implementations disclosed herein are illustrated by way of example, and not by way of limitation, in the figures of the accompanying drawings, in which like reference numerals refer to similar elements.

DETAILED DESCRIPTION

A test cartridge containing one or more sensors can be used for measuring and determining the functionality of an analysis instrument as it relates to actuating systems of analysis cartridges. As stated earlier, various analysis instruments, such as genomic sequencing systems, may utilize a cartridge-based framework in which various elements used during analysis are provided in one or more removable cartridges, e.g., a flowcell cartridge, a reagent cartridge, and/or a wash cartridge; in some implementations, all of these elements may be combined in a single analysis cartridge. In some instances, these analysis cartridges may contain consumable elements in various compartments that may be sealed by a layer of perforable foil. The analysis cartridges may also include, for example, various valves or pumps that may be actuatable through the application of rotational and/or linear inputs.

These analysis instruments may include features for preparing the analysis cartridges for use, such as movable protrusions for causing the foil to be pierced, rotational members for rotating one or more valves on the analysis cartridge, linear reciprocal members for actuating a pump mechanism to cause consumable elements, e.g., reagents, to be pumped through the analysis cartridge, and valves, such as pinch valves, that may be used for routing and controlling flow through the analysis cartridge.

Some analysis instruments may also have a heating probe for heating reagents and/or samples within a chamber of the analysis cartridge. It may be useful to test the functionality of one or more of the analysis instrument's cartridge interface mechanisms to ensure proper functionality and to diagnose problems with these mechanisms without disassembling the analysis instrument and while minimizing maintenance time and analysis instrument downtime.

Introduction of Analysis Cartridges and Analysis Instruments

A brief discussion of implementations of analysis cartridges, analysis instruments, and some of their systems and mechanisms is provided in the following sections to provide context for the test cartridges described later below.

Figure 1:
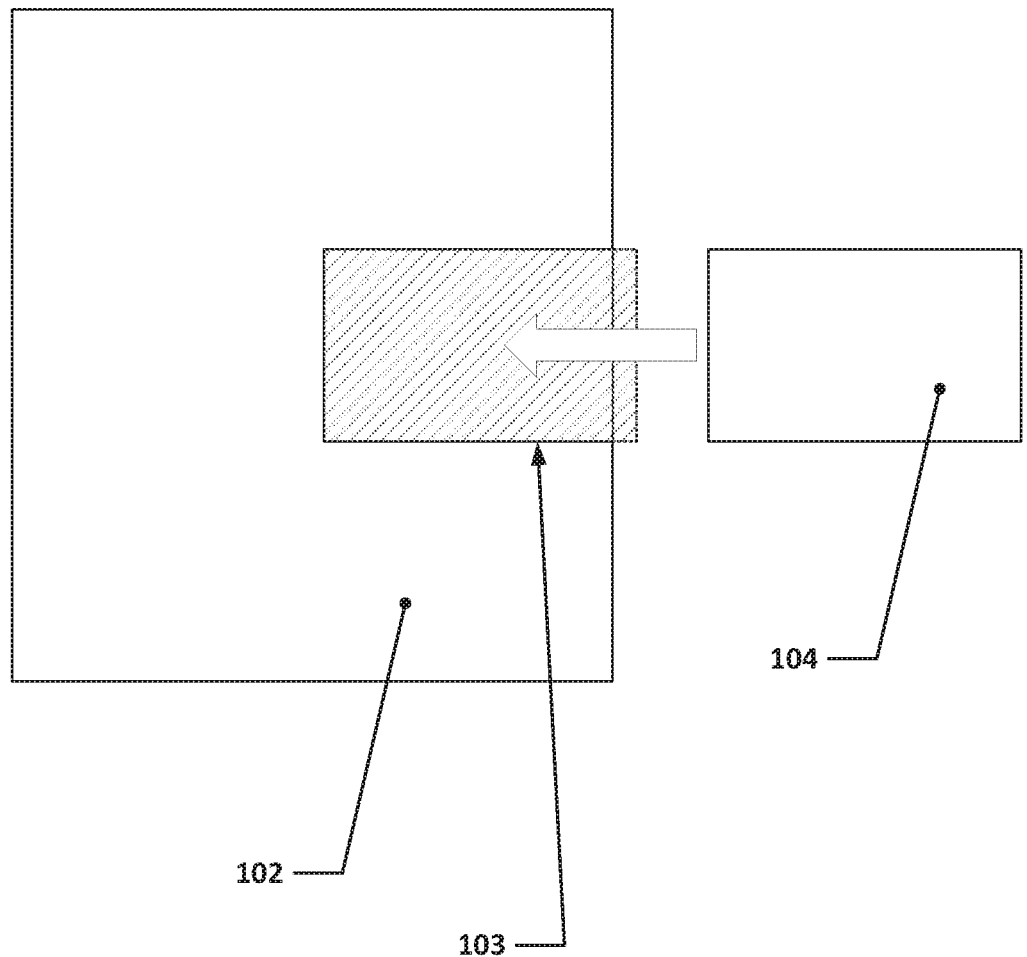
FIG. 1 depicts an implementation of an analysis instrument and a removable analysis cartridge thereof.

FIG. 1 depicts an implementation of an analysis instrument and a removable analysis cartridge thereof. In FIG. 1, analysis instrument 102 is provided and includes a receptacle, slot, or other interface 103 that is configured to receive an analysis cartridge 104 or a test cartridge (not shown) described below, which may be considered a cartridge receiver. The analysis instrument 102 may be configured to receive an analysis cartridge 104 (or any cartridge insertable or receivable therein) that is structured in a particular manner or have a particular form factor, e.g., having a height, width, and length within a particular envelope and, optionally, having various features, e.g., grooves, holes, protrusions, etc., that are designed to interface with complementary features, e.g., rails, pins, recesses, etc., in the receiving portion of the analysis instrument 102 to properly align the analysis cartridge 104 in the analysis instrument 102 and position the analysis cartridge 104 so as to be able to be properly interfaced with the various mechanical systems in the analysis instrument 102 that are configured to actuate various mechanisms within the analysis cartridge 104.

While not shown in FIG. 1, one or more guides or other devices within the analysis instrument 102 may, as discussed above, cause the analysis cartridge 104 to be positioned in a predetermined location relative to the analysis instrument's 102 mechanisms after the analysis cartridge 104 is fully inserted or installed into the analysis instrument 102. For example, the analysis cartridge 104 may be caused, e.g., through operation of a loading mechanism or other interface, to move vertically upwards and into contact with one or more cartridge interface mechanisms; in some other implementations, some of the cartridge interface mechanisms may be supported by movable interfaces that may be moved by an actuation mechanism after the analysis cartridge 104 is fully inserted into the analysis instrument 102 in order to bring the cartridge interface mechanism into contact with aspects of the cartridge housing.

Figure 2A:
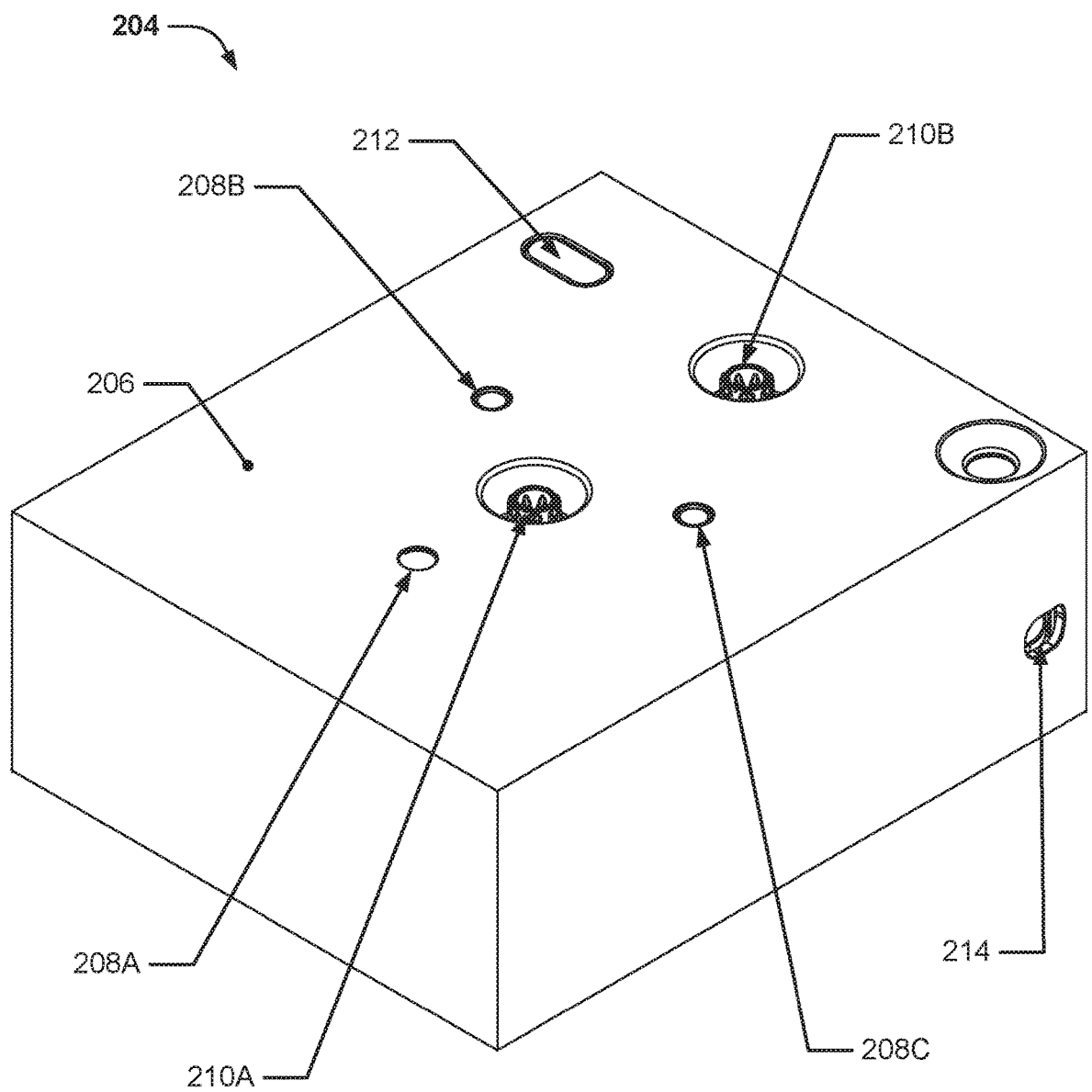
FIG. 2A depicts an off-angle view of an implementation of an analysis cartridge and FIG. 2B depicts a partially exploded view of the analysis cartridge.
Figure 2B:
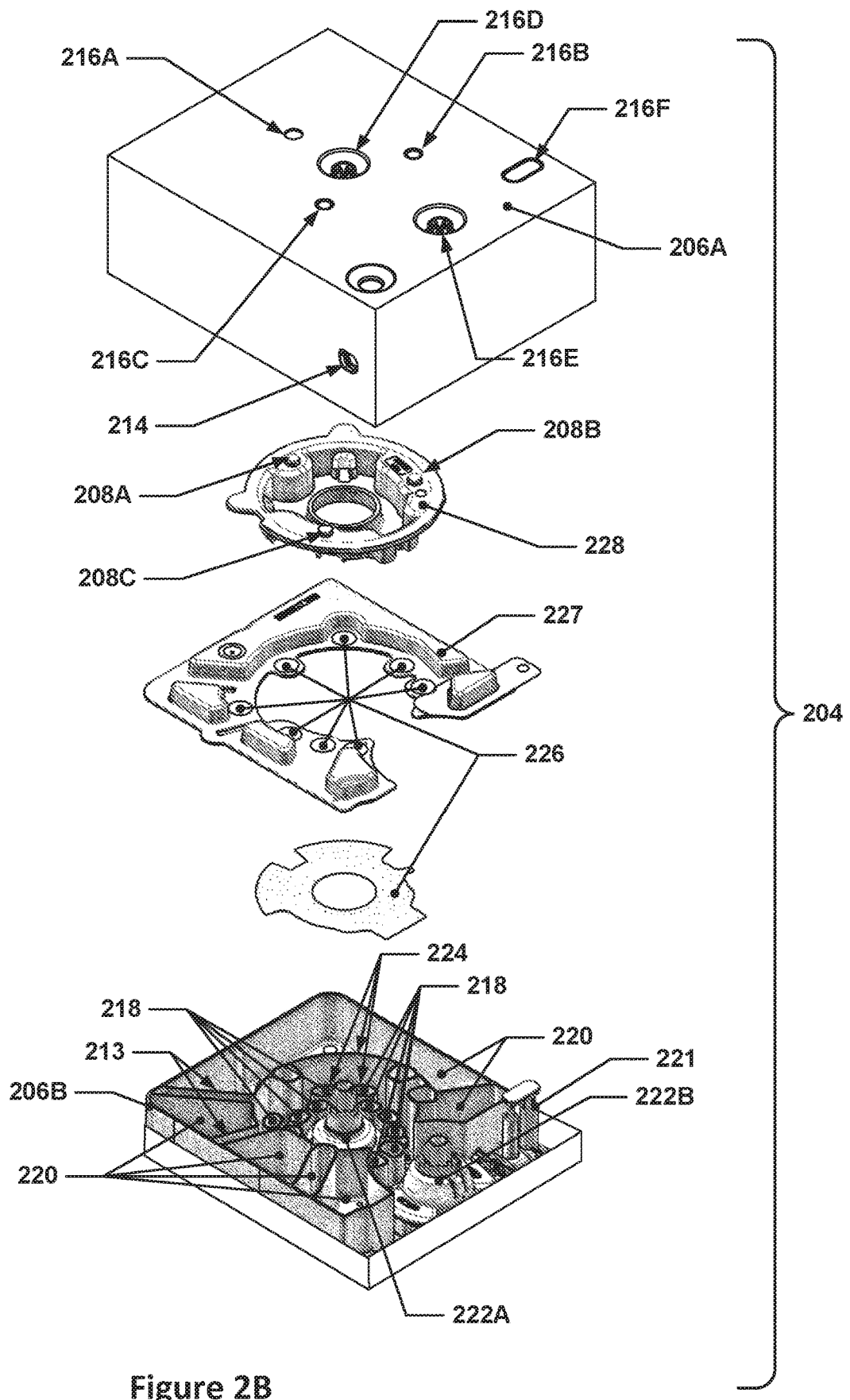

FIG. 2A depicts an off-angle view of an implementation of an analysis cartridge and FIG. 2B depicts a partially exploded view of the analysis cartridge. In FIG. 2A, the analysis cartridge 204 includes an analysis cartridge housing 206 with a form factor that allows it to be inserted into and received by an analysis instrument. The analysis cartridge 204 also includes a puncture disk for piercing a foil seal (not visible) within the analysis cartridge housing 206, that has three foil pierce mechanism contact points 208A-208C accessible to an analysis instrument's foil pierce mechanism through holes 216A-216C of the analysis cartridge housing 206; two rotary valves with visible splined shafts 210A and 210B; a pump actuation interface 212 for moving a reciprocal member of a pump mechanism 221 within the analysis cartridge housing 206; and a port 214 in the analysis cartridge housing 206 to receive a heater probe (not shown) of the analysis instrument. While not evident in FIG. 2A, the analysis cartridge 204 may house a number of reagent reservoirs, valves, seals, a pump, flow paths and other features to move and contain material within the analysis cartridge.

An implementation of the internal structure of the analysis cartridge 204 is seen in FIG. 2B. As discussed in more detail below, the analysis instrument 102 may include cartridge interface mechanisms to actuate each of these features of the analysis cartridge (or subsets thereof for analysis instruments that interface with analysis cartridges having fewer than all such systems and/or different systems), including a foil pierce mechanism, one or more rotary valve actuation mechanisms, a pump actuation mechanism, and a pinch valve actuation mechanism. In FIG. 2B, the analysis cartridge housing 206 is shown with a top portion 206A removed from a bottom portion 206B.

The top portion 206A includes holes 216A-216C to allow access to the foil pierce mechanism contact points 208A, 208B, and 208C by the foil pierce mechanism, holes 216D and 216E to allow access to the splined shafts 210A and 210B, and hole 216F to allow access to the pump actuation interface 212, which may be independent of or in conjunction with an opening or hole in bottom portion 206B to access a lower portion of the pump actuation interface 212. The hole 214 to receive the heater probe is also visible.

The bottom portion 206B of the analysis cartridge housing 206, in this implementation, includes a plurality of reservoirs that may each contain a reagent or other liquid that may be used by the analysis instrument 102 during analysis. In this implementation, there are approximately twenty five such reagent reservoirs, which, for discussion purposes, may be referred to herein as first reagent reservoirs 218 or second reagent reservoirs 220. It will be understood that various analysis cartridge implementations may feature different numbers and arrangements of reagent reservoirs.

The analysis cartridge 204 may include a microfluidic plate (not shown) that includes a plurality of flow channels, each of which may be fluidically connected with one or more of the reagent reservoirs. In some implementations, the microfluidic plate may be selectively coupled to the analysis cartridge 204 and may be part of a separate cartridge assembly. To allow for the reagents to be selectively flowed through the channels of the microfluidic plate, one or more valves, such as rotary valves 222A and 222B may be included in the analysis cartridge 204. Such rotary valves 222A and 222B may be configured to have a rotatable portion that may be caused to be rotated, e.g., by a rotational input provided by the analysis instrument, to cause different reagent reservoirs to be in fluidic communication with one or more reagent flow passages within the microfluidic plate at different times. These rotary valves 222A and 222B may include the splined shafts 210A and 210B (or other suitable rotational interface), respectively, identified in FIG. 2A for engaging with rotary drive shafts 234A and 234B of the analysis instrument 102 (discussed below in reference to FIG. 3).

The reagent reservoirs in analysis cartridge 204 are, in this implementation, each defined by one or more sidewalls 213 that rise up from a floor (such as the microfluidic plate) and are capped, in the case of the first reagent reservoirs 218, by a foil seal 226 that may be adhered or bonded to an upper edge of the sidewalls 213 of the first reagent reservoirs 218. In the case of the second reagent reservoirs 220, a reservoir cap 227 that has additional foil seals 226 that are attached to it may be adhered or bonded to an upper edge of the sidewalls 224 of those second reagent reservoirs 220. The foil seals 226 may be provided to seal the reagent reservoirs and prevent leakage of the reagents contains within.

When the analysis cartridge 204 is installed in the analysis instrument, the analysis instrument 102 may cause a puncture disk 228 to be actuated. The puncture disk 228 may have the three foil pierce mechanism contact points 208A-208C that are accessible to the foil pierce mechanism of the analysis instrument 102 through holes 216A-216C, respectively. The puncture disk 228 may also include a plurality of protrusions that are each positioned over the foil seal 226 that seals a particular reservoir such that when the puncture disk 228 is actuated towards the reagent reservoirs by the analysis instrument 102 foil pierce mechanism, the protrusions puncture the foil seals 226, thereby allowing the pressure within the reservoirs to equalize with the ambient environmental pressure and thereby allow reagents to be withdrawn from the reagent reservoirs without generating a vacuum within the reservoirs. If the seals are not punctured or not sufficiently punctured, to allow venting of the reagent reservoirs, the effectiveness of analysis instrument 102 to withdraw the reagents from the reagent reservoirs may be reduced due to pressure effects.

Figure 2C:
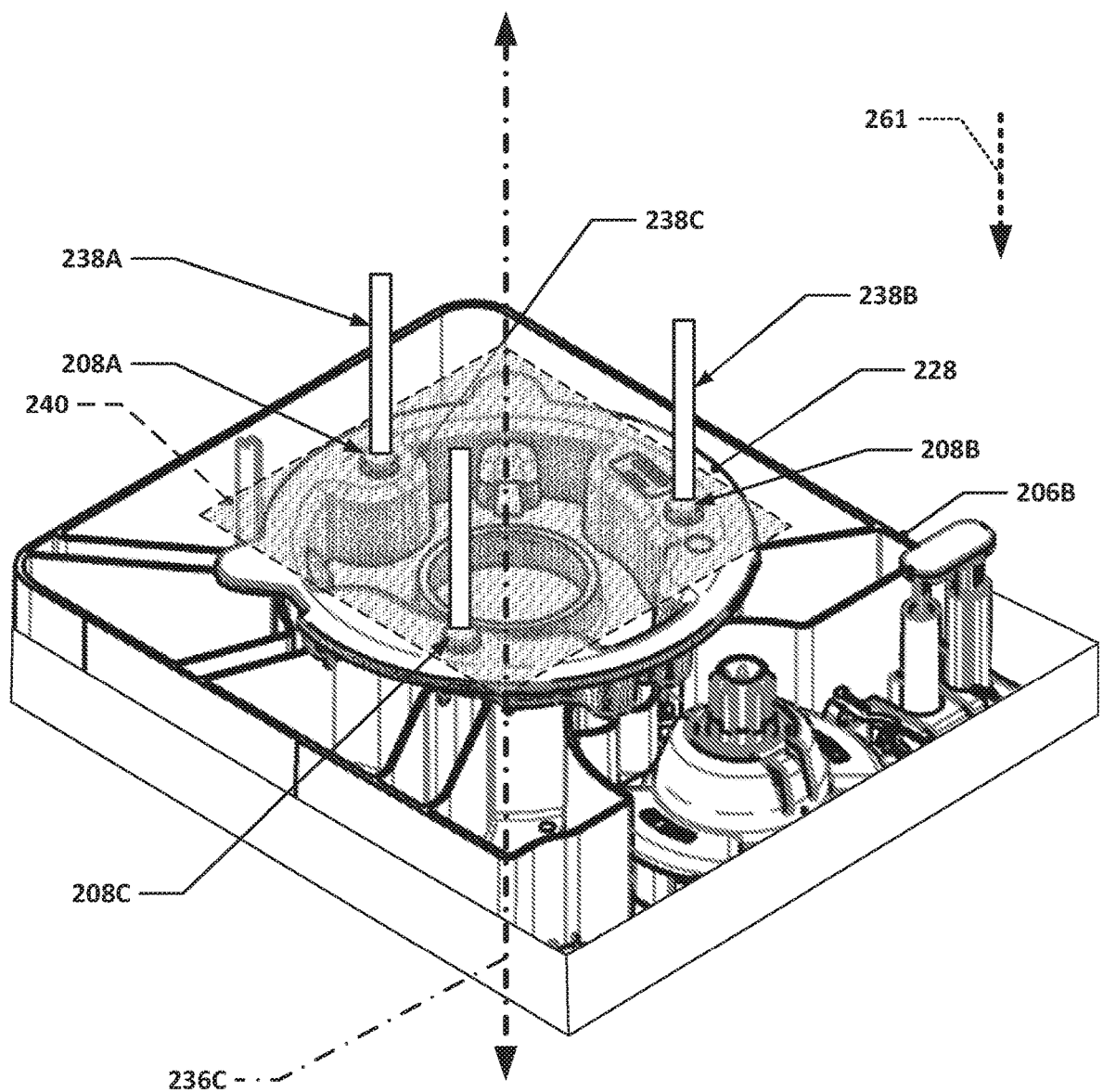
FIG. 2C depicts an off-angle view of the analysis cartridge of FIG. 2A with a top portion removed.

The foil pierce mechanism of the analysis instrument 102 may have three engagement pins that are each positioned to contact one of the three foil pierce mechanism contact points 208A-208C of the analysis cartridge 204 and move the puncture disk 228 towards the reagent reservoirs. FIG. 2C depicts an off-angle view of the analysis cartridge of FIG. 2A with the top portion 206A removed. In this Figure, without the top portion 206A, the puncture disk 228 is seen positioned on the lower portion 206B of the analysis cartridge. Three engagement pins 238A, 238B, and 238C of the foil pierce mechanism of the analysis instrument are seen corresponding to one of the three foil pierce mechanism contact points 208A-208C of the analysis cartridge 204 and the foil pierce mechanism may apply a linear force to each of the foil pierce mechanism contact points 208A-208C in order to move the puncture disk 228 along an axis 236C. To puncture the foil seal 226, the engagement pins 238A, 238B, and 238C move downwards (in this Figure) in a second direction 261 along the axis 236C in order to move the puncture disk 228 towards the foil seals 226 (not visible in this Figure) and cause the protrusions of the puncture disk 228 to puncture the foil seals 226.

It may be useful for the foil pierce mechanism of the analysis instrument 102 to apply equal force and movement to all of the foil pierce mechanism contact points 208A-208C of the puncture disk 228 to ensure all aspects of the foil seal 226 are punctured and punctured to a predetermined amount. This may include the engagement pins 238A, 238B, and 238C of the foil pierce mechanism translating towards the analysis cartridge 204 at substantially the same time, including at the same speed and by the same amount, in order to contact the puncture disk 228 at substantially the same time, disengage the puncture disk 228 from a retention assembly, and evenly apply pressure on the puncture disk 228 to cause it to pierce the foil seal 226 at a plurality of locations at substantially the same time. The retention assembly may exert a resistive force against the puncture disk 228 to reduce the likelihood or otherwise prevent the puncture disk 228 from dislodging unintentionally, such as during shipment and/or handling of the analysis cartridge prior to use. In addition, the foil seal 226 may also exert a resistive force against the puncture disk 228 during the puncturing phase and it may be useful to apply even pressure against this resistance. Unequal force by one of the foil pierce mechanism's engagement pins 238A, 238B, and 238C may result in misalignment of the puncture disk 228 when dislodged from the retention assembly and/or cause some of the foil not to be pierced, or not to be pierced enough, which may prevent access to one or more of the reagent reservoirs. The points of the three engagement pins 238A, 238B, and 238C that contact the puncture disk 228 may form a plane 240 that translates along the axis 236C and the functionality of the foil pierce mechanism of the analysis instrument 102 may be represented by this plane 240 being oriented perpendicular to the axis 236C. If the plane 240 is not perpendicular to the axis 236, then the engagement pins 238A, 238B, and 238C may apply unequal force and movement to the puncture disk 228, which may result in misalignment of the puncture disk 228 when dislodged from the retention assembly and/or cause the foil seal over some reservoirs to possibly not be punctured. In order to measure and determine the functionality of the analysis instrument's foil pierce mechanism, it may be useful to test the movement, alignment, and/or the force applied by each of the foil pierce mechanism's engagement pins.

Figure 3:
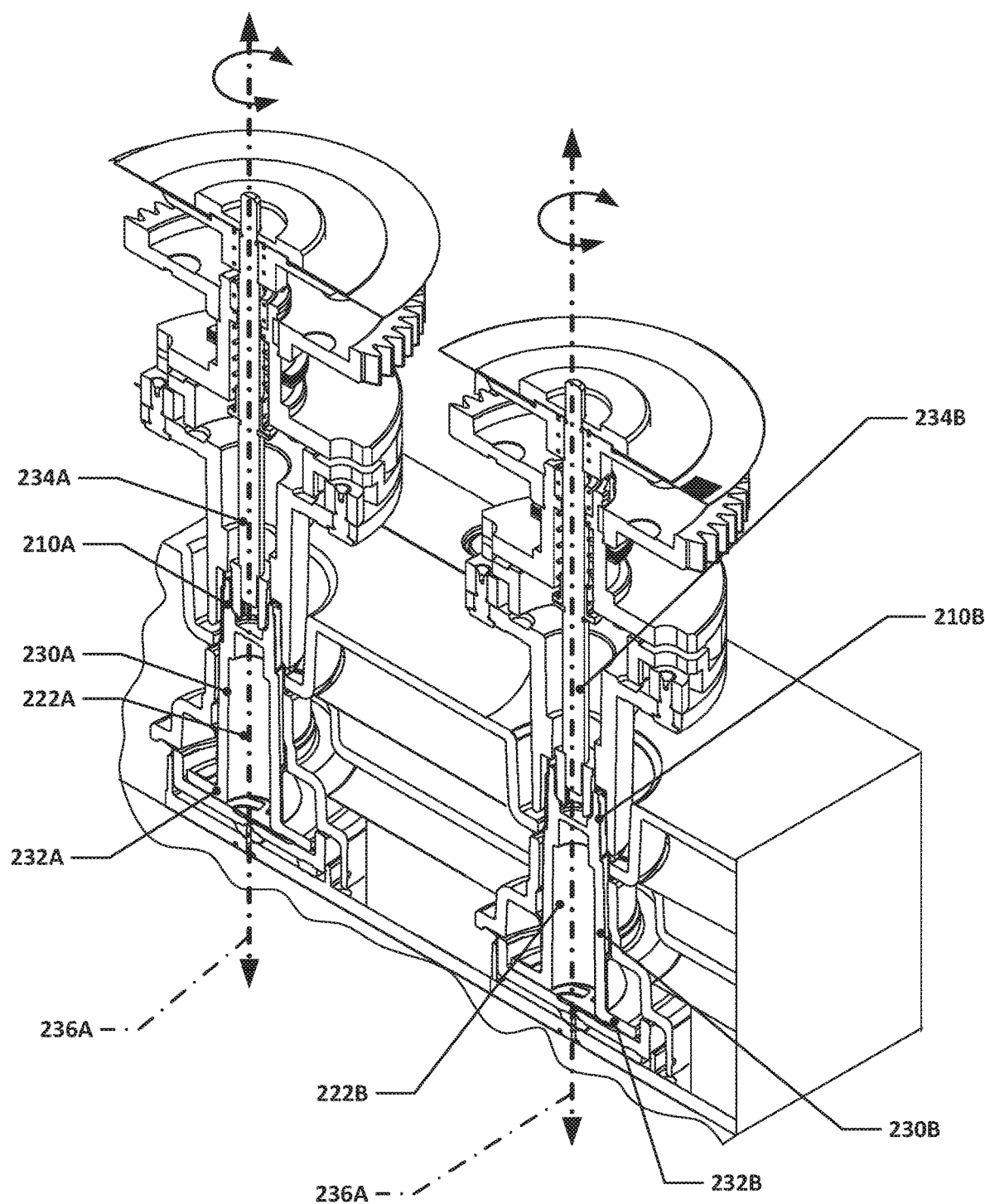
FIG. 3 depicts an off-angle, cross-sectional view of an analysis cartridge and a rotary valve drive mechanism of an analysis instrument.

As also mentioned earlier, the analysis instrument 102 may include a rotary valve drive mechanism for rotating the rotary valves on the analysis cartridge. FIG. 3 depicts an off-angle, cross-sectional view of an analysis cartridge and a rotary valve drive mechanism of an analysis instrument. Here, the two rotary valves 222A and 222B of the analysis cartridge 204 each have a shaft 230A and 230B connected to or including the respective splined shaft 210A and 210B, and a corresponding valve seat 232A and 232B. The rotary valve drive mechanism of the analysis instrument 102 includes two rotary drive shafts 234A and 234B that can engage splined shafts 210A and 210B of the analysis cartridge's 204 rotary valves 222A and 222B, respectively, and can rotate these splined shafts 210A and 210B about rotation axes 236A and 236B. The rotary valve drive mechanism may include motors and gears to apply a torque to each of the analysis cartridge's 204 rotary valves 222A and 222B; such torques may be independently applied by the rotary drive mechanism. In order to measure and determine the functionality of the analysis instrument's rotary valve drive mechanism, it may be useful to test the rotational movement and/or the torque applied by each of the rotary drive shafts 234A and 234B.

Figure 4:
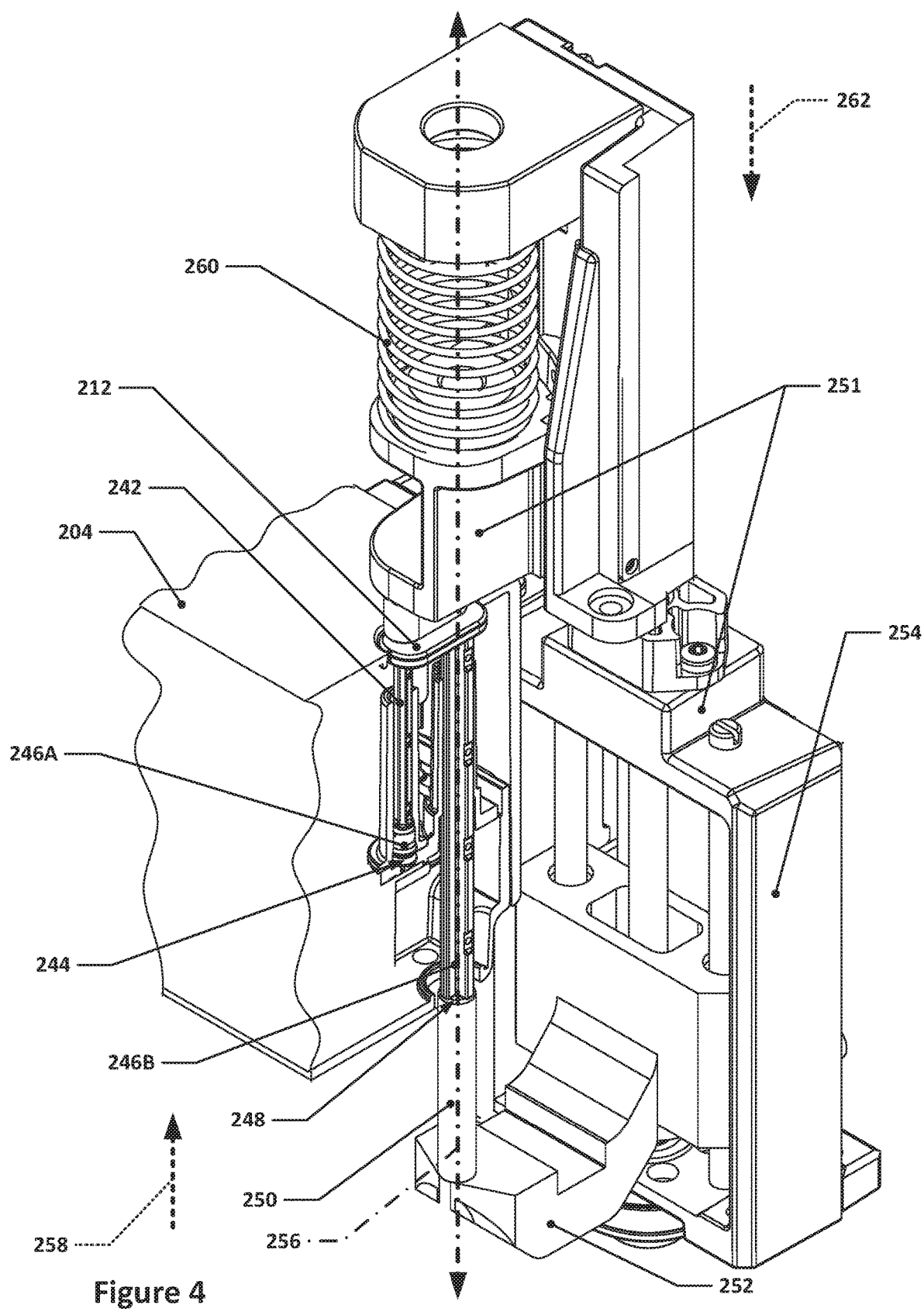
FIG. 4 depicts a cross-sectional view of an implementation of an analysis cartridge having a pump mechanism.

The analysis instrument 102 may also include a pump actuation mechanism 251 to move the pump mechanism 221 within the analysis cartridge in order to generate a positive or negative pressure within one or more flowpaths of the analysis cartridge. FIG. 4 depicts a cross-sectional view of an implementation of an analysis cartridge having a pump mechanism 221. Here, a portion of the pump mechanism 221 of the analysis cartridge 204 includes as an upside-down U-shaped piston 242 having a plunger 244 at one end 246A and a sealed contact 248 at a second end 246B. At the top of the piston 242 is the pump actuation interface 212 shown in FIG. 2A which can be partially seen in FIG. 4. The pump actuation mechanism 251 illustrated in FIG. 4 includes a pin 250 connected to an arm 252 that is movable by an arm movement mechanism 254 that causes the arm 252 and pin 250 to move along a translation axis 256. The analysis instrument's pin 250 is caused to contact the analysis cartridge's 204 sealed contact 248 of the piston 242 and to move the piston 242 along a first direction 258, which is shown as upwards in FIG. 4; this movement of piston 242 may generate a vacuum or positive pressure in the analysis cartridge 204 in order to move liquids within the flow paths of the analysis cartridge 204.

The pump actuation mechanism 251 of FIG. 4 also includes a resistive force element 260, shown as a spring, to exert a force on the pump actuation interface 212 of the piston 242 along the translation axis 256 in the opposite direction of the first direction, indicated as a second direction 262 which is downwards in FIG. 4. This opposite-direction force exerted by the resistive force element 260 enables the piston 242 to be oscillated or reciprocated along the translation axis 256 in order to pump and move contents within the analysis cartridge 204 when the arm movement mechanism 254 moves downwardly and/or is disengaged. It may be useful to measure and determine the functionality of the analysis instrument's pump actuation mechanism 251 by testing the movement and/or force applied by the pin 250, the arm 252, and the arm movement mechanism 254, as well as the resistive force element 260.

Figure 5:
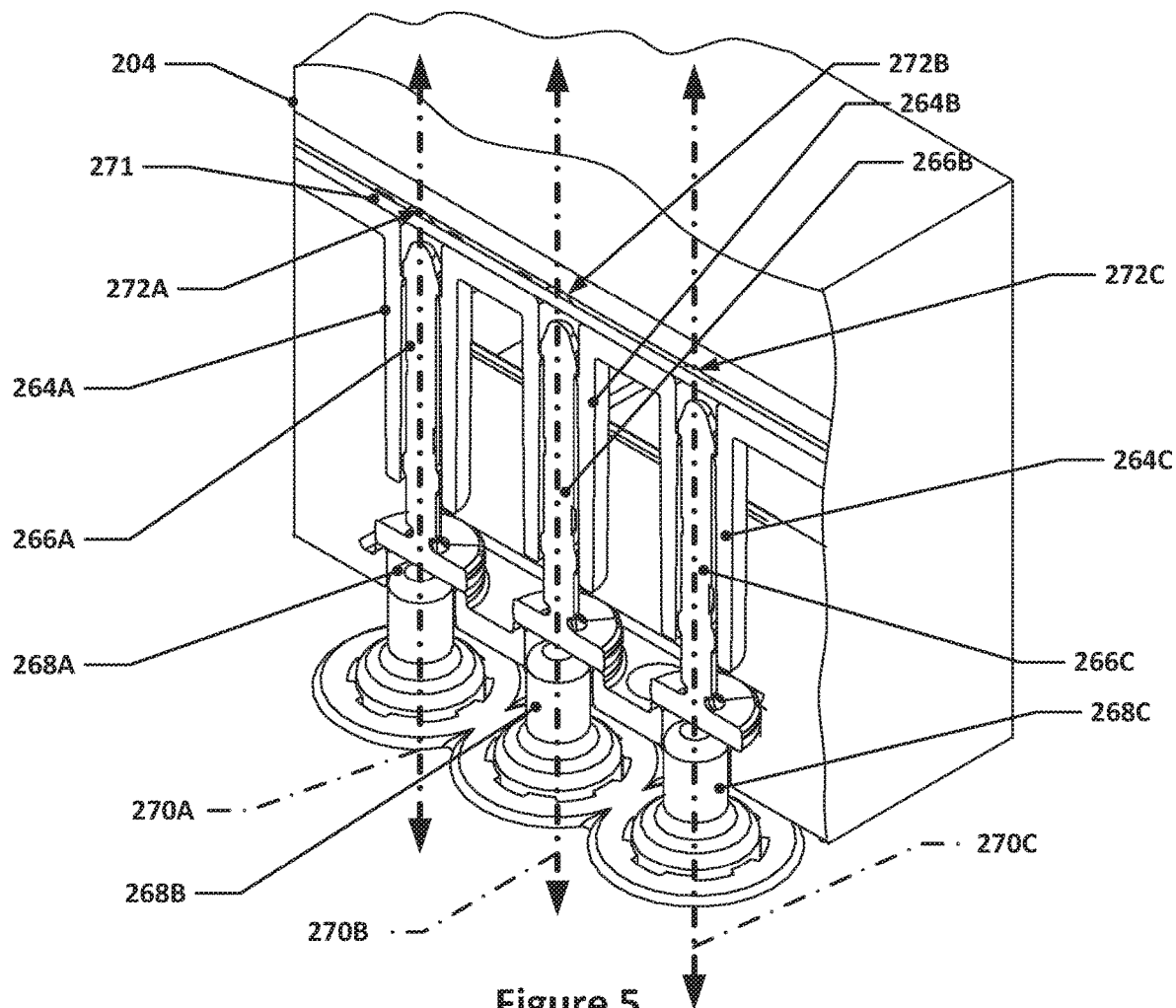
FIG. 5 depicts a cross-sectional view of a portion of an implementation of an analysis cartridge and a valve actuation system of an analysis instrument.

Some analysis cartridges may also have various pinch valves in which a valve membrane is placed over a port. In order to actuate such a pinch valve, an analysis instrument 102 may have a valve actuation system that applies a linear force against the membrane which causes the membrane to become tightly sealed against one or more ports, which may include an inlet and an outlet. FIG. 5 depicts a cross-sectional view of a portion of an implementation of an analysis cartridge 204 and a valve actuation system of an analysis instrument. The analysis cartridge 204 includes three pinch valves 264A, 264B, and 264C that each have a pushrod, 266A, 266B, and 266C, respectively, that is moveable within the analysis cartridge 204 in order to contact a membrane 271 which in turn contacts and selectively seals against, respectively, a fluid line 272A, 272B, and 272C. The valve actuation system of the analysis instrument 102 includes three linear actuator members 268A, 268B, and 268C that are each movable in order to contact, respectively, the pushrods 266A, 266B, and 266C and to cause each pushrod 266A, 266B, and 266C to distend, respectively, along an axis 270A, 270B, and 270C in order to contact the membrane 271 and cause the membrane 271 to seal a fluid line 272A, 272B, or 272C. Each pinch valve 264A, 264B, and 264C may be designed for a particular force to be applied in order to sufficiently seal the valve's membrane against the port. If that particular force is not applied, then the valve may not seal properly. In order to test the functionality of the valve actuation system, including the applied force, it may be useful to measure and determine the applied force of each of the valve actuation system's linear actuator members 268A, 268B, and 268C.

Figure 6:
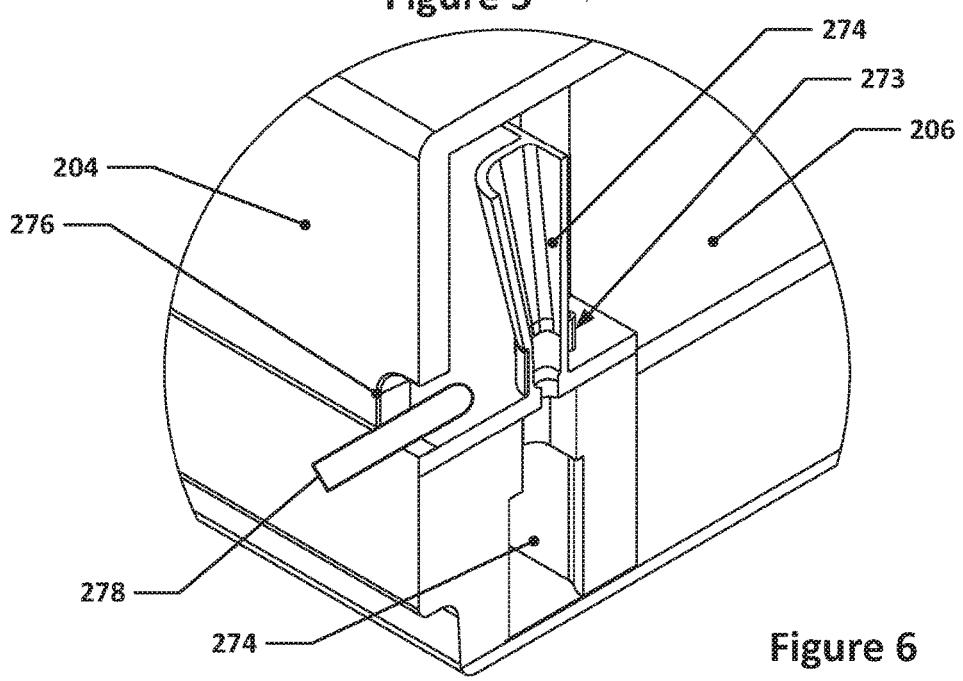
FIG. 6 depicts a cross-sectional view of another portion of an implementation of an analysis cartridge and a heater probe.

Some analysis instruments may have a heating probe that is inserted into an analysis cartridge and brought into contact with a receptacle of the analysis cartridge, such as a sample tube holder or reservoir, in order to heat the material within that receptacle. FIG. 6 depicts a cross-sectional view of another portion of an implementation of an analysis cartridge and a heater probe. The analysis cartridge 204 includes a receptacle 274 inside the analysis cartridge housing 206 and a port 276 into which a heater probe 278 of the analysis instrument 102 is inserted so that the heater probe 278 can contact the receptacle 274, or a part thermally connected to the receptacle 274 such as a heating collar that encircles all or a portion of the receptacle 274 and distributes heat to the receptacle 274, and apply heat to the receptacle 274. It may be useful to test the functionality of the heating probe, such as the temperature that the heating probe generates inside the receptacle of the analysis cartridge.

Implementations of Test Cartridges

Some test cartridges containing one or more sensors can be used for measuring and determining the functionality of an analysis instrument 102 as it relates to actuating systems for analysis cartridges. As noted in reference to FIG. 1, for some analysis instruments 102, the analysis cartridge 104 may be inserted into an interface 103 of the analysis instrument 102. As a result, the analysis cartridge 104 may be isolated and/or otherwise inaccessible from the exterior of the analysis instrument 102, such as to substantially reduce contamination, vibrations, light intrusion, etc. affecting the analysis cartridge 104 during operations performed by the analysis instrument 102. In some implementations, the different actuating systems of the analysis instrument 102 can be separately tested prior to assembly. However, when fully assembled into the analysis instrument 102, such actuating systems may be less accessible or inaccessible from the exterior of the analysis instrument 102 such that determination of the operations of each actuating system may be difficult. In addition, as several actuating systems may interoperate during operations of the analysis instrument 102, determining acceptable performance of several actuating systems at substantially the same time and/or on a simulated analysis cartridge 104, such as the test cartridge described herein, may be useful for quality control purposes and/or field diagnostic purposes. For example, such test cartridges can determine if one or more of the actuating systems may be operating below an acceptable performance criterion and/or interfering with or affecting others of the actuating systems. Such detection can occur without disassembly of the analysis instrument 102 to access the actuating systems therein. Moreover, in some implementations, the test cartridge may output data indicative of the performance of one or more of the actuating systems. In some instance, the outputted data can be utilized by the analysis instrument 102 to update predetermined values and/or otherwise modify the performance of one or more of the actuating systems to recalibrate or otherwise modify the operations of the analysis instrument 102 to meet acceptable performance criteria.

As discussed in more detail below, the test cartridge may include one or more linear translation sensors to measure the linear movement of and/or the force applied by the analysis instrument's linear actuation features, such as may be used in a piercing mechanism, a pump actuation mechanism, and/or a valve actuation mechanism. The test cartridge may also include one or more angular rotation sensors to measure the angular rotation and/or the torque caused by the analysis instrument's rotational actuation systems. In some instances, the test cartridge may include one or more load cells for measuring a linearly applied force provided by the analysis instrument, and/or one or more temperature sensors for measuring the performance of a heating element of the analysis instrument.

These sensors may be positioned within test cartridges and arranged to simulate various functionalities of the analysis cartridges features and mechanisms. This may allow for an analysis instrument to engage with the test cartridge in generally the same manner as an analysis cartridge. For example, the test cartridge may have angular rotation sensors with external splined shafts that have at least some of the same external features as the analysis cartridge's splined shafts and that are positioned within the test cartridge such that when the test cartridge is inserted into and positioned within in the analysis instrument, these splined shafts are in the same positions with respect to the analysis instrument as an analysis cartridge's splined shafts as their counterparts in an actual analysis cartridge would be. These angular rotation sensors may also simulate the operation of the rotary valves in an analysis cartridge, including the resistance exerted by such valves to the analysis instrument's rotary valve drive mechanism. Similarly, the linear translation sensors to test the foil pierce mechanism may have features that are similar to an analysis cartridge, such as providing contact points for the engagement pins in the same locations as on the foil puncture disk, and may simulate the functionality of the analysis cartridge including the resistance exerted by a foil seal during puncturing by the puncture disk. In some implementations, additional sensors may also simulate the positioning and functionality of an analysis cartridge's features so that the analysis instrument may engage with multiple aspects of the test cartridge. In some implementations, the test cartridge not provide any other functionality except to measure the operability of the analysis instrument actuation features, e.g., no actual foil piercing, no actual pumping, and no actual valves.

Figure 7:
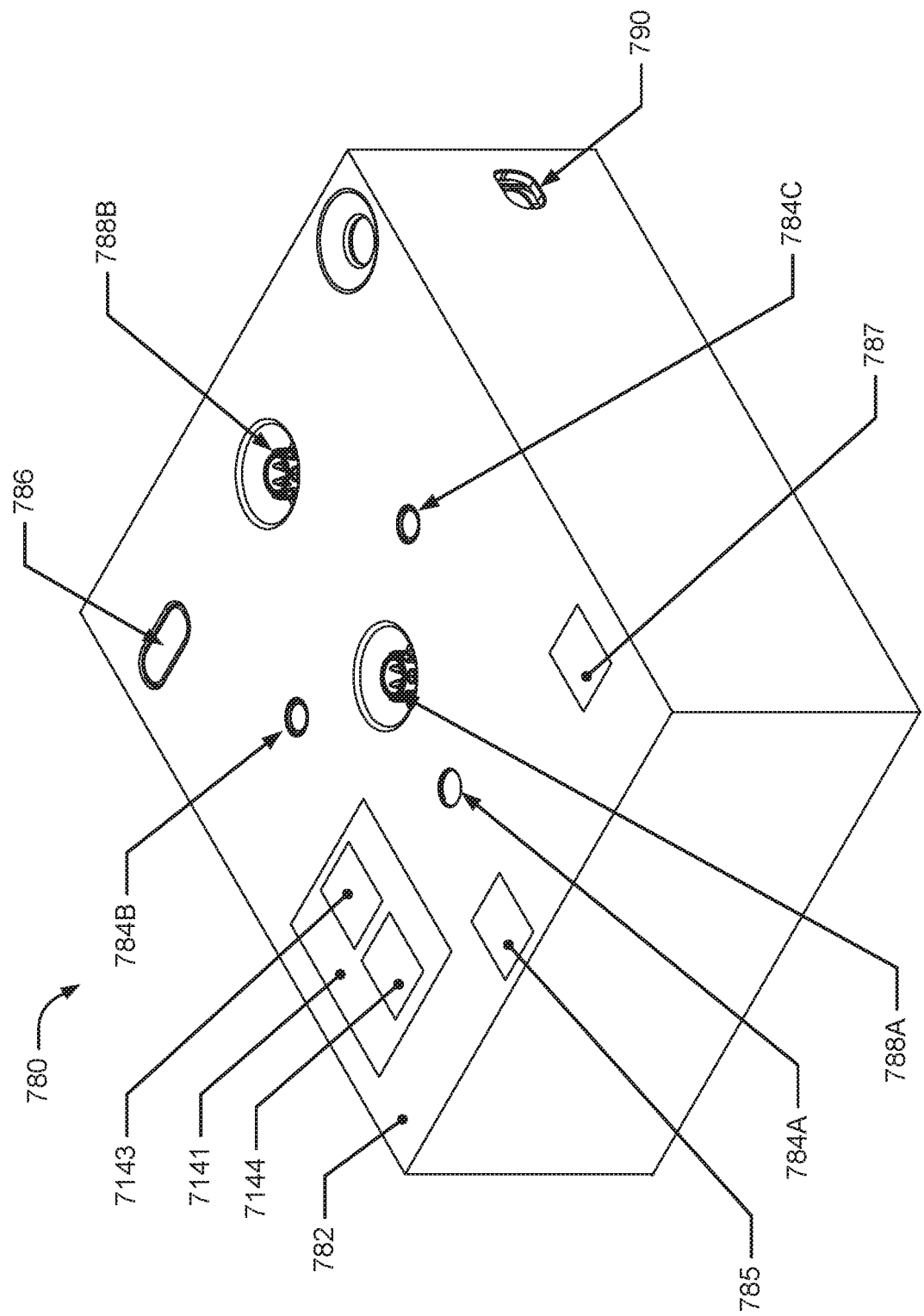
FIG. 7 depicts an implementation of a test cartridge having a plurality of sensors.

FIG. 7 depicts an implementation of a test cartridge having a plurality of sensors. This test cartridge 780 has a test cartridge housing 782, a plurality of first linear translation sensors 784A, 784B, and 784C, a second linear translation sensor 786, one or more angular rotation sensors 788A and 788B, and a temperature sensor (not shown) near a port 790 of the test cartridge housing 782. These and other sensors are discussed in turn below.

The test cartridge housing 782 may have a form factor that allows the test cartridge 780 to be inserted into and received by the analysis instrument 102 in the same manner as an analysis cartridge 104. This enables the actuating systems of the analysis instrument 102 to engage with the test cartridge 780 in the same manner as the analysis cartridge 104 which allows the test cartridge 780 to measure, determine, and test the actuating systems of the analysis instrument 102. The test cartridge 780 may be inserted into the slot, cartridge receiver, or other interface 103 that is configured to receive the analysis cartridge 104, ensuring that the test cartridge 780 is properly positioned, oriented, and secured in the same place as the analysis cartridge 104 when the analysis instrument 102 is performing analysis operations. For example, the test cartridge 780 may be caused, e.g., through operation of the loading mechanism or other interface, to move vertically upwards and into contact with one or more cartridge interface mechanisms of the analysis instrument 102; in some other implementations, some of the cartridge interface mechanisms that are supported by movable interfaces may be moved by an actuation mechanism of the analysis instrument 102 after the test cartridge 780 is fully inserted into the analysis instrument 102 in order to bring the cartridge interface mechanism into contact with aspects of the test cartridge 780. The form factor of the test cartridge housing 782 may, in some implementations, be a prismatic volume having an overall length of approximately 250 millimeters, including about 242 millimeters, and an overall width of approximately 150 millimeters, including about 142 millimeters, and an overall height of approximately 75 millimeters, including about 73 millimeters.

The plurality of first linear translation sensors 784A, 784B, and 784C may be used to measure and determine various aspects of the performance of the analysis instrument's 102 foil pierce mechanism, including the distance moved and force applied by each of the analysis instrument's 102 engagement pins (not shown in FIG. 7), and the alignment of these engagement pins. When the test cartridge 780 is inserted into and positioned within the analysis instrument 102 in the same position as an analysis cartridge 104, the engagement pins of the analysis instrument's 102 foil pierce mechanism may each contact and move one corresponding first linear translation sensor 784A, 784B, and 784C. These first linear translation sensors 784A, 784B, and 784C may each detect the distance moved and force applied by one of the engagement pins, as well as the alignment of all of the engagement pins with respect to each other as discussed below.

Figure 8:
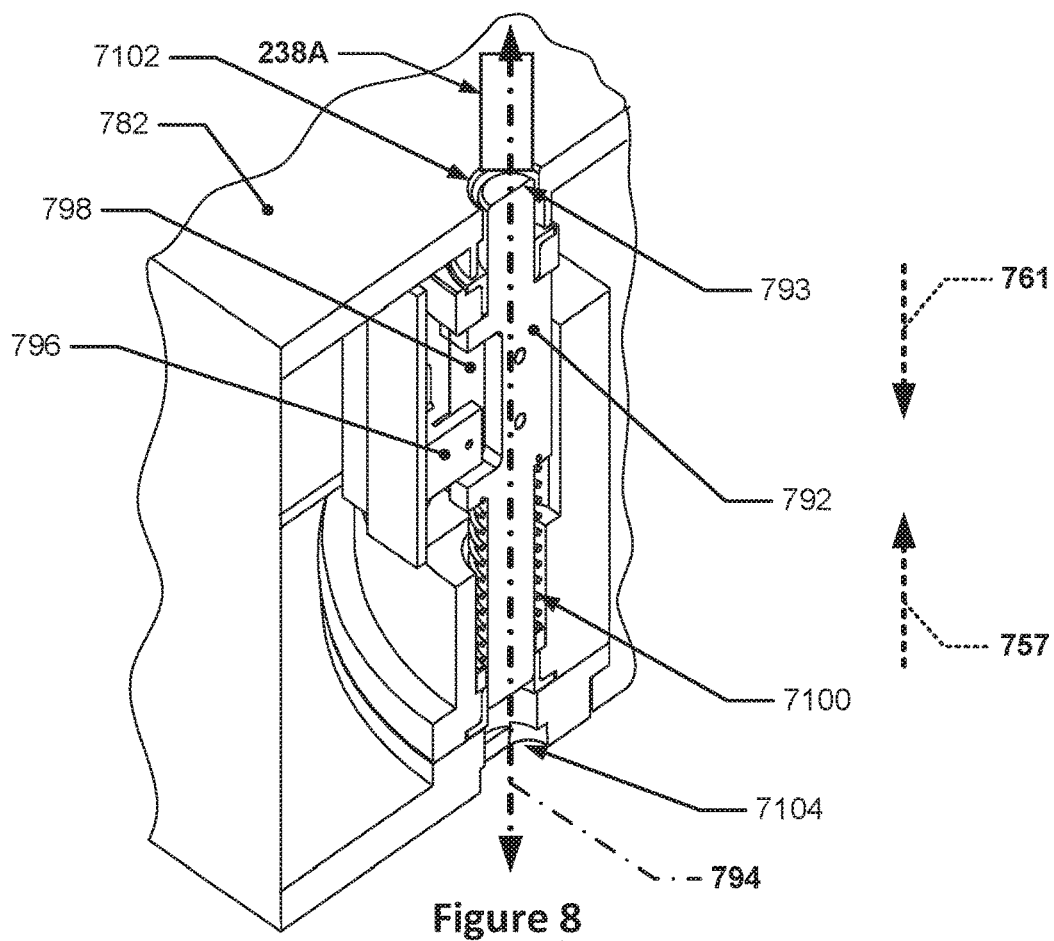
FIG. 8 depicts a cross-sectional view of a first linear translation sensor within the test cartridge of FIG. 7.

FIG. 8 depicts a cross-sectional view of a first linear translation sensor within the test cartridge 780 of FIG. 7. Although only one of the first linear translation sensors, such as sensor 784A, is seen in FIG. 8 within the test cartridge housing 782, each of the first linear translation sensors 784A, 784B, and 784C may generally all be identical to each other and placed at locations corresponding to the contact points for the engagement pins of the analysis instrument 102 foil pierce mechanism. Thus, while only one linear translation sensor (784A) is discussed in reference to FIG. 8, this discussion is equally applicable to the other first linear translation sensors 784B and 784C. The first linear translation sensor 784A includes a movable element 792 that is linearly translatable along a first axis 794. The movable element 792 includes a contact point 793 which a corresponding engagement pin, such as engagement pin 238A illustrated in FIG. 8, may contact in order to move the movable element 792 along the first axis 794, such as in the second direction 761 (this may be the same second direction as in FIG. 2C). Accordingly, the three engagement pins 238A, 238B, and 238C of FIG. 2C may each contact and move, respectively, the first linear translation sensors 784A, 784B, and 784C of the test cartridge 780 in the second direction 761. In some implementations, the first axis 794 is oriented within the test cartridge housing 782 so that the first axis 794 is parallel with the axis 236C (not shown) when the test cartridge 780 is inserted into and positioned within the analysis instrument 102 in order for the first linear translation sensor 784A to simulate movement of the puncture disk 228 (not shown) of an analysis cartridge 104.

The first linear translation sensor 784A also includes a first detector 796 to detect a distance moved by the movable element 792 along the first axis 794 relative to the test cartridge housing 782. In some implementations as illustrated in FIG. 8, the first detector 796 may be an optical sensor, such as an optical encoder reader, to detect a movement of an encoder strip 798 positioned on the movable element 792. The first detector 796 may also be another type of detector, such as an incremental encoder, a laser distance sensor, a linear variable displacement transducer, and a magnetic encoder.

In some implementations, it may be useful for the first linear translation sensors 784A, 784B, and 784C of the test cartridge 780 to simulate the resistive force of the retention assembly and/or the foil seal that the foil pierce mechanism experiences in order to detect and measure the functionality of the foil pierce mechanism under conditions that mimic actual operations of dislodging the puncture disk and/or piercing of foil. Each first linear translation sensor 784A, 784B, and 784C may therefore include a resistive element to apply a resistive force against the sensor's movable element 792 along the first axis 794. FIG. 8 illustrates this resistive element 7100 as a compression spring The resistive force applied by the resistive element 7100 may be in the first direction 757 (this may be the same first direction as in FIG. 2C) which is opposite to the second direction 761; this second direction 761 is the direction the engagement pins 238A, 238B, and 238C move when they are causing the puncture disk 228 to puncture the foil seal 226 on the analysis cartridge 204, and the first direction 757 is the direction of the foil seal's 226 resistance against the movement of the puncture disk 228 and the engagement pins 238A, 238B, and 238C. In some implementations, the first direction 757 may additionally or alternatively represent the resistive force of the retention assembly that retains the puncture disk 228 in place when not in use. The puncture disk 228 is held in a storage position by the retention assembly and during operations, the puncture disk 228 is dislodged by the engagement pins 238A, 238B, and 238C and moveable towards within the analysis cartridge 204 when a force of a particular amount is exerted by the engagement pins 238A, 238B, and 238C in the second direction 761 against the puncture disk 228 which overcomes the retention force of the retention assembly, as represented by the first direction 757, thereby freeing the puncture disk 228 and allowing it to move.

This arrangement of the first linear translation sensors 784A, 784B, and 784C allows for the measurement and determination of whether each individual engagement pin 238A, 238B, and 238C, has moved the intended amount, as well as whether the individual engagement pins 238A, 238B, and 238C are aligned with each other, including during a simulated operation, such as a foil piercing and/or disengagement from a retention assembly. If one or more of the distances measured by each first linear translation sensor 784A, 784B, and 784C are not within a first threshold from a first distance and/or not within a second threshold from each other, then this may indicate that the engagement pins 238A, 238B, and 238C are not aligned with each other, not at the same elevation, and/or not functioning properly. Referring back to FIG. 2C, this also may indicate that the plane 240 is not perpendicular, or not within a threshold amount of perpendicular, to the axis 236C.

For example, if a first measured distance by one first linear translation sensor 784A is not within the first threshold from the first distance, then this may indicate that the engagement pin which contacted that one first linear translation sensor 784A is out of alignment or not functioning properly. Similarly, if the first measured distance by that one first linear translation sensor 784A is not within the second threshold from the measured distances of the other two first linear translation sensors 784B and 784B, then this may indicate that the engagement pins are not in alignment with each other. In some implementations, the movement of each first linear translation sensor 784A, 784B, and 784C may be between about 0.01 millimeters and 10 millimeters, including between about 0.1 millimeters and 9 millimeters, and between about 0.01 millimeters and 8.4 millimeters, and it may be useful to have the first threshold be, for example, within ±10%, ±5%, or ±1% of that movement value. In some implementations, the engagement pins 238A, 238B, and 238C may be considered to be aligned if the distances they travel are, for example, within ±10% of each other, ±5% of each other, ±1% of each other; these values may form the second threshold.

Because the foil seal exerts resistance against the puncture disk, which in turn exerts a resistance against the engagement pins of the analysis instrument's foil pierce mechanism, measuring the foil pierce mechanism's operation under resistance may be useful because the operation of the foil pierce mechanism may be different with and without the applied resistance. Measurements made using first linear translation sensors that each have a resistive element may enable an assessment of the analysis instrument's foil pierce mechanism under the conditions of a simulated foil seal piercing operation of an analysis cartridge. These measurements may include whether each individual engagement pin has moved the intended amount, and whether the individual engagement pins are aligned with each other during a piercing operation. This may therefore enable the determination of whether the foil pierce mechanism is properly and evenly applying pressure to the foil seal.

Using first linear translation sensors 784A, 784B, and 784C that each have a resistive element (7100) may also enable the determination of a force applied to each sensor. According to Hooke's law, the force to compress or extend a spring is directly proportional to the distance it is moved, which is represented as F=−kx, with F being the Force, k being the spring constant, and x being the displacement of the spring. The force applied by each engagement pin 238A, 238B, and 238C against each first linear translation sensor may therefore be determined by measuring the displacement distance moved by the movable elements in each of the first linear translation sensors 784A, 784B, and 784C and multiplying those distances by the known spring constant of the resistive element 7100 for each first linear translation sensor FF84A, 784B, and 784C. This may enable the determination of the force applied by the engagement pins 238A, 238B, and 238C and whether they are applying a predetermined force, e.g., the same force or a force that meets or exceeds a threshold force. In some implementations, the force applied to each first linear translation sensor 784A, 784B, and 784C may be at least approximately 25 Newtons (N), including at least about 30 N, about 33 N, and about 35 N, and it may be useful to have the threshold be, for example, within ±10%, ±5%, and ±1% of that value.

In some implementations, the test cartridge housing 782 may have a plurality of first holes that allow the engagement pins 238A, 238B, and 238C to contact the first linear translation sensors 784A, 784B, and 784C and move into the test cartridge housing 782, and a plurality of second holes that allow the movable elements of the first linear translation sensors 784A, 784B, and 784C to move outside of the test cartridge housing 782 while the movable elements of each first linear translation sensor 784A, 784B, and 784C are moved by the engagement pins 238A, 238B, and 238C. In FIG. 8, one first hole 7102 and one second hole 7104 of the test cartridge housing 782 are illustrated. The first hole 7102 enables the depicted engagement pin 238A to contact the movable element 792 and to move into the test cartridge housing 782. The second hole 7104 enables the movable element 792 to move in the second direction 762 through the second hole 7104 outside the test cartridge housing 782. The test cartridge housing 782 includes these first and second holes 7102 and 7104 for each of the first linear translation sensors 784A, 784B, and 784C. In some implementations, the second holes 7104 may be omitted and the moveable element 792 moves within the cartridge housing 782, but not outside of the cartridge housing 782.

Referring back to FIG. 7, the test cartridge 780 may also or alternatively include the second linear translation sensor 786 that may be used to measure and determine the functionality of the analysis instrument's pump actuation mechanism 251. For example, the second linear translation sensor 786 may measure the distance that the arm movement mechanism 254 causes the arm 252 and pin 250 to move along the translation axis 256 as shown in FIG. 4. This second linear translation sensor 786 may have the same or similar functionality as the first linear translation sensors 784A, 784B, and 784C described above.

Figure 9:
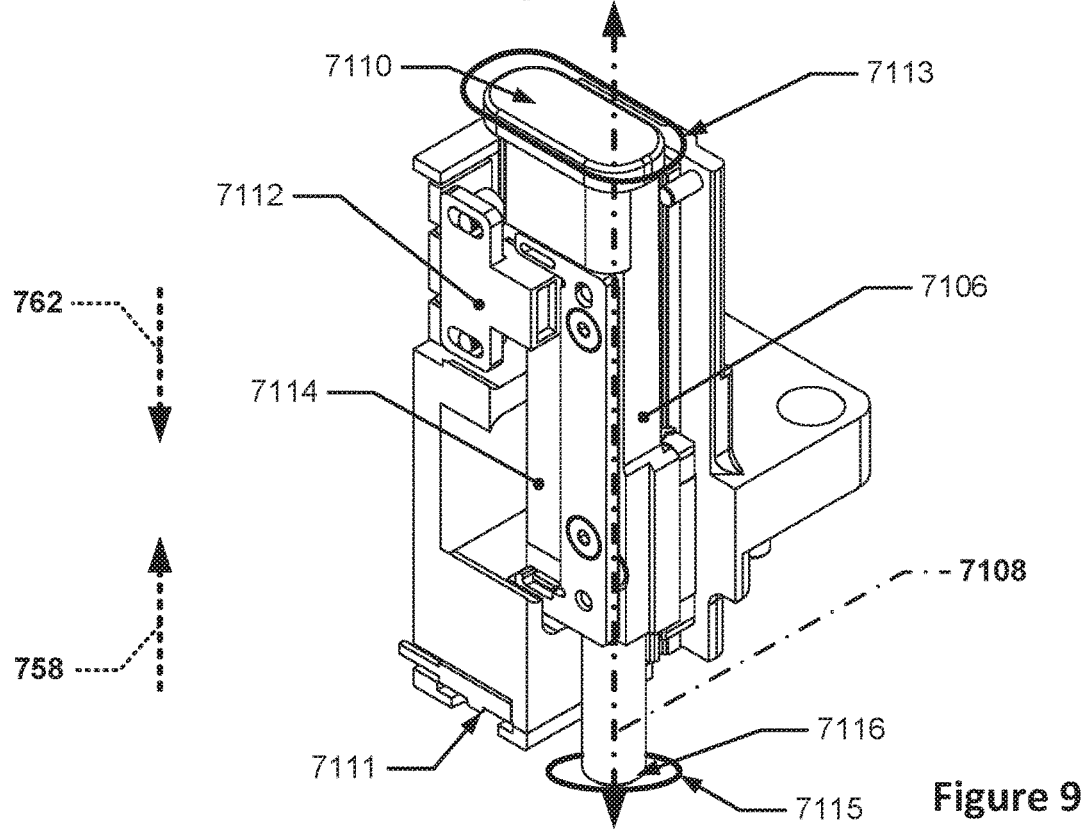
FIG. 9 depicts a cross-sectional view of a second linear translation sensor within the test cartridge of FIG. 7.

FIG. 9 depicts a cross-sectional view of a second linear translation sensor within the test cartridge 780 of FIG. 7. The second linear translation sensor 786 includes a second movable element 7106 that is linearly translatable along a second axis 7108. The second movable element 7106 includes a contact interface 7110 which may be contacted by the resistive force element 260 of the pump actuation mechanism 251 shown in FIG. 4, similar to the pump actuation interface 212 of the analysis cartridge 204. In some implementations, the second axis 7108 is oriented within the test cartridge housing 782 so that the second axis 7108 is parallel with the axis 256 (not shown in FIG. 9 but shown in FIG. 4) when the test cartridge 780 is inserted into and positioned within the analysis instrument 102 in order for the second linear translation sensor 786 to simulate movement of the piston 242 (not shown) of an analysis cartridge 104. The second linear translation sensor 786 also includes a second detector 7112 to detect a distance moved by the second movable element 7106 along the second axis 7108 relative to the test cartridge housing 782. In some implementations as illustrated in FIG. 9, the second detector 7112 may be an optical sensor, such as an optical encoder reader, to detect a movement of a second encoder strip 7114 positioned on the second movable element 7106. The detector 7112 may also be another type of detector, such as an incremental encoder, a laser distance sensor, a linear variable displacement transducer, and a magnetic encoder.

The second linear translation sensor 786 of the test cartridge 780 may be used to measure and determine the functionality of the analysis instrument's pump actuation mechanism. Referring back to FIG. 4 discussed above, the arm movement mechanism 254 of the analysis instrument 102 causes the arm 252 and pin 250 to move along the translation axis 256 and in the first direction 259. When the test cartridge 780 is positioned within the analysis instrument 102, the analysis instrument's pin 250 may contact a first end 7116 of the second movable element 7106 (as seen in FIG. 9) and the arm movement mechanism 254 of the analysis instrument 102 may cause the arm 252 and pin 250 to move the second movable element 7106 along the second axis 7108 (seen in FIG. 9) in the first direction 758 (of FIG. 9), which may be the same as the translation axis 256 and the first direction 259 of FIG. 4. During this movement, the resistive force element 260 of the analysis instrument 102 shown in FIG. 4 may exert a force on the contact interface 7110 of the second movable element 7106 along the second axis 7108 in the second direction 262, which again may be the same as the translation axis 256 and the first direction 259 of FIG. 4.

As the arm movement mechanism 254 of the analysis instrument 102 moves the second movable element 7106, the detector 7112 measures the distance moved by the second movable element 7106 in order to determine the total distance moved by the arm movement mechanism 254 as well as the force applied by the arm movement mechanism 254. The force may be determined using the known spring constant of the analysis instrument's resistive force element 260 and the measured displacement distance. Determinations may also be made whether the measured distance and force applied are the predetermined amounts and/or within permissible thresholds from these amounts, such as ±10%, ±5%, ±4%, or ±1%. In some such implementations, the movement of the second linear translation sensor 786 may be between about 0.01 millimeters and 35 mm, including between about 0.1 mm and 30 mm, between about 0.01 mm and 28 mm, and between about 0.01 mm and 27.6 mm, and it may be useful to have this distance be, for example, within ±10%, ±5%, and ±1% of that value.

In some implementations, similar to described above, the test cartridge housing 782 may have another first hole 7113 and another second hole 7115 to allow movement of the second movable element 7106. For example, the other first hole 7113 and the other second hole 7115 may be opposite from each other, the analysis instrument's pin 250 may be insertable through the other second hole 7115 in order to move the second movable element 7106 along the second axis 7108 in the first direction 758. As the second movable element 7106 is moved in the first direction 758 along the second axis 7108, the first end 7116 of the second movable element 7106 may pass through the other second hole 7115, and the second movable element 7106, including the contact interface 7110, may also move through the other first hole 7113. Similarly, as the second movable element 7106 moves in the second direction 762, the second movable element 7106 may pass through the other first hole 7113, and first end 7116 may pass through the other second hole 7115.

Although not visible in FIG. 7, the test cartridge 780 may also or alternatively include a plurality of load cells to measure one or more linear force applications provided by the analysis instrument, e.g., such as by the analysis instrument's valve actuation system. In FIG. 9, one load cell 7111 is visible and is accessible through a bottom of the test cartridge housing 782. These load cells 7111 may be used to measure the force applied by the three linear actuator members 268A, 268B, and 268C of the valve actuation mechanism along the axes 270A, 270B, and 270C, respectively. In some implementations, these load cells may utilize a strain gauge. When contacted by a linear actuator member 268A, 268B, or 268C, each load cell 7111 may deflect and change or generate a value which may be used to determine the magnitude of the applied force. For instance, a load cell 7111 that includes a strain gauge may change its resistance under an applied force by a linear actuator member 268A, 268B, or 268C, and this change in resistance may cause a change in voltage across that load cell 7111, which may in turn be used to determine the applied force. The load cells may be able to measure various forces, including between about 0 N and about 30 N, including between about 0 N and 20 N. In some other implementations, the load cell 7111 may be able to detect and measure the applied force of any other member of the analysis instrument, such as one of the engagement pins 238A, 238B, and 238B.

The test cartridge 780 of FIG. 7 may also or alternatively include one or more angular rotation sensors 788A and 788B that may be used to measure and determine the functionality of the analysis instrument's 102 rotational input mechanism, such as the rotary valve drive mechanism described above with respect to FIG. 3. This may include testing and measuring the rotational movement and/or the torque applied by each of the rotary drive shafts 234A and 234B in FIG. 3. Similar to the first linear translation sensors described above, it may be useful to have the angular rotation sensors 788A and 788B of the test cartridge 780 simulate the resistance and movement of an analysis cartridge's 104 rotary valves 222A and 222B.

Figure 10:
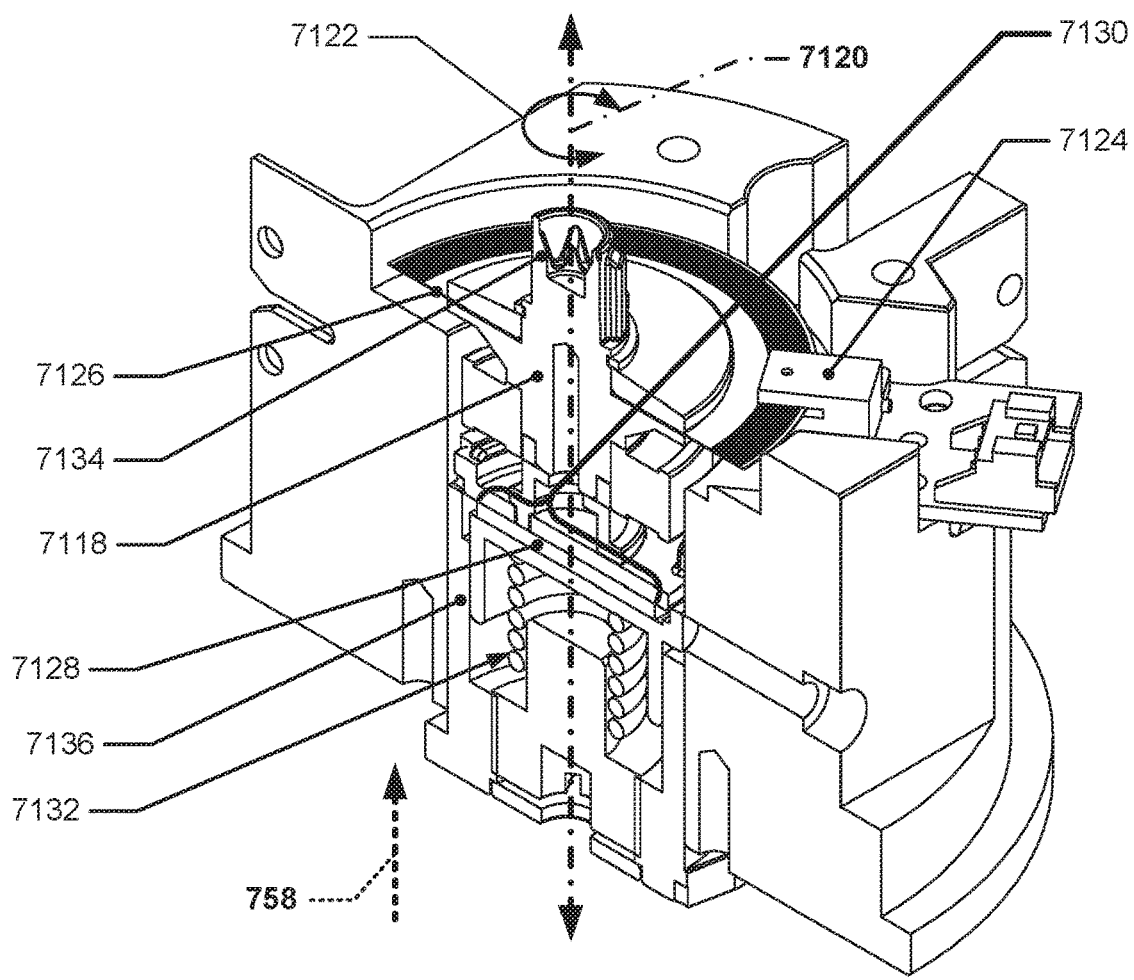
FIG. 10 depicts a cross-sectional view of an angular rotation sensor within the test cartridge of FIG. 7.

FIG. 10 depicts a cross-sectional view of an angular rotation sensor within the test cartridge 780 of FIG. 7. This sensor, which may be angular rotation sensor 788A, may include a rotatable element 7118 that is rotatable about a rotation axis 7120, as indicated by double arrow 2122. This rotation axis 7120 is positioned within the test cartridge housing 782 such that when the test cartridge 780 is inserted into and positioned within the analysis instrument, the rotation axis 7120 is parallel to, and in some implementations collinear with, rotation axes 236A and 236B described above and shown in FIG. 3. This may allow the analysis instrument's rotary drive shafts 234A and 234B to engage the test cartridge's 780 angular rotation sensor's 788A rotatable element 7118 and rotate it about the rotation axis 7120 similar to rotating an analysis cartridge's rotary valves 222A and 222B, including rotation about axes 236A and 236B shown in FIG. 3. The angular rotation sensor 788A may also include a detector 7124 to detect and measure an angle moved by the rotatable element 7118. In some implementations, the detector 7124 may be an optical sensor, such as an optical encoder reader, to detect the angle moved by an encoder disk 7126 positioned on the rotatable element 7118. The detector 7124 may also be another type of detector, such as an incremental encoder and a magnetic encoder.

In some implementations, it may be useful for the angular rotation sensor 788A to have resistance, including adjustable resistance, against angular rotation of the rotatable element 7118 in order to simulate resistance of rotary valves on an analysis cartridge. This resistance may be applied in various ways. In FIG. 10, the angular rotation sensor 788A includes a friction element 7128 that contacts a first surface 7130 of the rotatable element 7118 in order to apply frictional resistance against the rotatable element 7118. As the rotatable element 7118 is rotated about the rotation axis 7120, the friction between the first surface 7130 and the friction element 7128 causes the rotatable element 7118 to experience rotational resistance. In some instances, the angular rotation sensor 788A may also include a resistive force element 7132, shown in FIG. 10 as a spring, that may apply an axial force against the rotatable element 7118 in order to increase the friction and thus the rotational resistance against the rotatable element. In some such instances, as shown in FIG. 10, the angular rotation sensors 788A and 788B may include both the resistive force element 7132 and the friction element 7128 which may work together to cause rotational resistance to the rotatable element 7118 by the resistive force element 7132 applying an axial force along the rotation axis 7120 in the first direction 758 to the friction element 7128 and causing additional friction resistance between the friction element 7128 and the rotatable element 7118 at the first surface 7130. In some instances, the axial force applied by the resistive force element 7132 may be adjustable. For example, in FIG. 10, the force applied by the resistive force element 7132, i.e., the spring, may be adjusted by compressing or uncompressing the spring within a sensor housing 7136 of the angular rotation sensor 788A.

In some implementations, the rotatable element 7118 may also include features to engage with the rotary valve drive mechanism, including the rotary drive shafts 234A and 234B in FIG. 3. These features may include a splined shaft 7134 on the rotatable element 7118 as well as gears and a slotted keyway.

As rotary valve drive mechanism of the analysis instrument 102 rotates each angular rotation sensor 788A and 788B of the test cartridge 780, the detector 7124 measures the angle moved by the rotatable element 7118 in order to determine the total angle moved by each of the rotary drive shafts 234A and 234B of the rotary valve drive mechanism. In some implementations, each rotatable element 7118 may be rotatable by a particular amount, including at least 250 degrees, 275 degrees, 300 degrees, 320 degrees, 340 degrees, and 345 degrees. A determination may be made whether the measured angle is within a threshold of the angle, such as within ±10%, ±5%, ±1%, ±0.5%, and ±0.3% of that value. In some implementations, the torque exerted on each rotatable element may also be determined by the angular rotation sensors 788A and 788B. For example, in the implementation of FIG. 10, the torque may be calculated using the known resistance and applied axial force, and the measured angle of movement. In some other implementations, the angular rotation sensors 788A and 788B may include a torque sensor to measure the torque. The above discussion of angular rotation sensor 788A is equally applicable to angular rotation sensor 788B; these sensors may be identical to each other or provide similar functionality and use similar structures. In some implementations having two or more angular rotation sensors, such as 788A and 788B, the rotational axes of at least two of these sensors may be parallel to each other.

Figure 11:
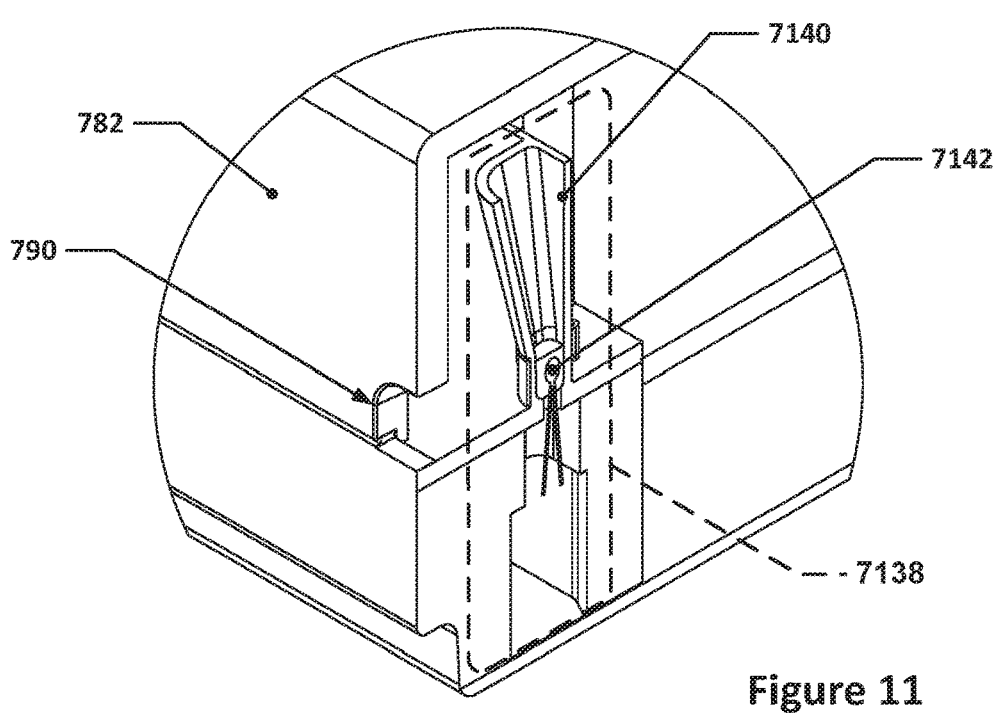
FIG. 11 depicts a cross-sectional view of a temperature sensor within the test cartridge of FIG. 7.

The test cartridge 780 may also or alternatively include a temperature sensor near the port 790 of the test cartridge housing 782 in order to measure a temperature within the test cartridge 780 cause by the analysis instrument's heating element, such as a heater probe. As described above with reference to FIG. 6, the analysis instrument 102 may have a heating element for heating a receptacle, and its contents, within the analysis cartridge. It may therefore be useful to measure the temperature reached inside the receptacle to determine whether the contents inside the receptacle are being heated to the temperature. In some implementations, a temperature of an intermediate component, such as a heating collar or band may be measured instead. FIG. 11 depicts a cross-sectional view of a temperature sensor within the test cartridge 780 of FIG. 7. The temperature sensor 7138 includes a test receptacle 7140 and a temperature detector 7142 positioned inside the test receptacle 7140 to detect and measure the temperature reached inside the test receptacle 7140. The test cartridge housing 782 also includes the port 790 into which the heating probe (not shown) of the analysis instrument 102 may be inserted in order to heat the test receptacle 7140. In some instances, the test receptacle 7140 may be made of the same material as the receptacle of an analysis cartridge, such as a thermoplastic, a metal such as copper, a copper alloy, aluminum or an aluminum alloy, and stainless steel, or other material such as a ceramic, in order to simulate the heat transfer of, and thermal conditions within, the analysis cartridge. The test receptacle 7140 may also include the same features of the receptacle in the analysis cartridge, such as a heating collar, internal volume, and wall thickness, for instance. The temperature detector 7142 is to detect the temperature in the receptacle; the temperature detector 7142 may be a thermocouple, a thermistor, a passive infrared sensor, and a resistance temperature detector (RTD). The temperature detector 7142 may be able to detect temperatures ranging from about 0 degrees to about 125 degrees, including between about 0 degrees and 100 degrees.

In some other test cartridge 780 implementations, the test cartridges 780 may have only some of the sensors described above. For example, some test cartridges 780 may only include the plurality of first linear translation sensors and not the remaining sensors. In another implementation, some test cartridges 780 may have the two angular rotation sensors and the temperature sensors. It is contemplated that the test cartridges 780 of this disclosure may have any combination of the sensors provided herein.

Each of the sensors described above may generate data and some test cartridges 780 may include one or more memory devices for storing this generated data. Some test cartridges 780 may also include one or more processors that are in communication with the sensors and the one or more memory devices and that may receive the data and store that data on the one or more memory devices; the one or more processors may also or alternatively access the data stored on the one or more memory devices and cause that data to be transmitted as discussed below. In some implementations, the one or more processors and one or more memory device may be a part of a controller on the test cartridge 780. Referring back to FIG. 7, a controller 7141 having a processor 7143 and a memory device 7144 are representationally shown on the test cartridge 780 to indicate this test cartridge 780 includes the controller 7141 with the processor 7143 and the memory device 7144.

The processor 7143 in communication with (e.g., operating in collaboration with) the memory device 7144 (which may be one or more memory devices) may execute instructions of the program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. The memory device 7144 may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The controller 7141 may also be communicatively connected to each of the sensors, including each of the detectors, including the first detector 796 of each first linear translation sensor 784A, 784B, and 784C, the second detector 7112 of the second linear translation sensor 786, the load cells 7111, the detector 7124 of each of the angular rotation sensors 788A and 788B, and the temperature detector 7142 of the temperature sensor 7138. Each of these sensors may generate data as described above, such as measurement data (e.g., distance data, angle data, strain data, voltage data, and temperature data) that may be communicated to the controller 7141 and stored on the memory device 7144.

In some implementations, the test cartridge 780 may also include a data access port 785 (shown in FIG. 7) communicatively connected to the controller 7141 and for connecting to an external device and transmitting the data stored on the memory device 7144 to that external device, such as a computer, smart device, other controller, server, and the like. In some implementations, the test cartridge 780 may also include a wireless communications interface communicatively connected to the controller 7141 for wirelessly connecting to the external device and wirelessly transmitting the data stored on the memory device 7144 to that external device.

In some implementations, the test cartridge 780 may also include a communications interface 787 to communicate with the analysis instrument 102, or other device, and transmit data generated by the test cartridge's 780 sensors to the analysis instrument 102 (or other device). The communications interface 787 may communicate with a corresponding communications interface of the analysis instrument which may be a wireless or wired connection between the analysis instrument and the test cartridge. The analysis instrument 102 may receive and store this generated data, and/or may make adjustments to its actuation mechanisms based on that generated and received data. The testing may be one or more actuations or engagements of the test cartridge's 780 sensors by the analysis instrument 102, including any and all of those described herein. For example, a testing of the analysis instrument's 102 foil puncture mechanism may include the analysis instrument's 102 engagement pins contacting and moving the three first linear sensors of the test cartridge 780, during which each of these sensors may generate movement data for the corresponding movable elements. This movement data may be stored on the memory device of the test cartridge 780 and/or transmitted to the analysis instrument 102. Once received by the analysis instrument 102, an adjustment may be made to foil pierce mechanism based on this generated data, such as an adjustment to the movement distance by one of the engagement pins.

In some implementations, the movement data may represent data generated by each of the first linear translation sensors 784A, 784B, and 784C. This may include the raw data generated by each of these sensors 784A, 784B, and 784C, the total distance moved by each movable element 792 of each first linear translation sensor 784A, 784B, and 784C, and the distance moved in each direction (e.g., in the first and second directions, 761 and 757 of FIG. 8). This may also include a determination of the force applied by the linear actuation mechanism, a determination of whether the distance moved by each movable element 792 of each first linear translation sensor 784A, 784B, and 784C is within or outside a threshold amount, such as a pass/fail assessment with respect to one or more predetermined thresholds, and a determination of whether the distances moved by each movable element 792 of each first linear translation sensor 784A, 784B, and 784C indicate that they are aligned with (e.g., coplanar with) each other as discussed herein. This movement data may be transmitted to the analysis instrument and used to calibrate the analysis instrument. This calibration may include adjusting the distance moved and/or force applied by the foil pierce mechanism.

In some implementations, the movement data may represent data generated by the second linear translation sensor 786. This may include the total distance moved by the second movable element 7106 of the second linear translation sensor 786, and the distance moved in each direction (e.g., in the first and second directions, 762 and 758 of FIG. 9). This may also include a determination of the force applied by the pump actuation mechanism, and a determination of whether the distance moved by the second movable element 7106 is within or outside a threshold amount, such as a pass/fail assessment with respect to one or more predetermined thresholds. This movement data may be transmitted to the analysis instrument and used to calibrate the analysis instrument. This calibration may include adjusting the distance moved and/or force applied by the pump actuation mechanism 251 (shown in FIG. 4).

In some implementations, the movement data may represent data generated by each of the angular rotation translation sensors 788A and 788B. This may include the total angle moved by each rotatable element 7118 of each angular rotation translation sensors 788A and 788B, the distance moved in each direction (e.g., clockwise and counterclockwise about the rotation axis 7120 of FIG. 10), and the torque applied by the valve drive mechanism. This may also include a determination of whether the distance moved by each rotatable element 7118 of each angular rotation translation sensors 788A and 788B is within or outside a threshold amount, such as a pass/fail assessment with respect to one or more predetermined thresholds. This movement data may be transmitted to the analysis instrument and used to calibrate the analysis instrument. This calibration may include adjusting the angle moved and/or torque applied by the valve drive mechanism.

In some implementations, the movement data may represent data generated by each of the load cells 7111. This may include the total force applied by each linear actuator member of the valve actuation mechanism. This may also include a determination of whether the measured force by each load cell 7111 is within or outside a threshold amount, such as a pass/fail assessment with respect to one or more predetermined thresholds. This movement data may be transmitted to the analysis instrument and used to calibrate the analysis instrument. This calibration may include adjusting the distance moved and force applied by the valve actuation mechanism In some implementations, the data received and stored by the controller 7141 may represent data generated by the temperature sensor including the raw temperature detector 7142 data and the measured temperature. This may also include a determination of whether the measured temperature is within or outside a threshold amount, such as a pass/fail assessment with respect to one or more predetermined thresholds. This data may be transmitted to the analysis instrument and used to calibrate the analysis instrument. This calibration may include adjusting the heat applied by the heater, such as an increase or decrease of the power delivered to the heater.

A determination may also be made as to whether the generated data indicate any improper functioning of the foil pierce mechanism, such as whether a distance moved by a linear translation sensor is outside of a threshold, a force is outside a predetermined threshold, and/or the engagement pins are aligned with each other. This determination may be made by a processor or other processing logic on the test cartridge or in the analysis instrument. The adjustment to the analysis instrument may also be based on this determination. After this adjustment, another test, or engagement between the test cartridge and the foil pierce mechanism, may be performed. Additional adjustments, determinations, and tests may be repeated for the foil pierce mechanism.

Similarly, testing and adjustments of the analysis instrument using any of the other test cartridge sensors may be performed. This may include the valve drive mechanism engaging with the test cartridge's angular rotation sensors and rotating the rotatable elements, the angular rotation sensors generating data during the rotation, the test cartridge transmitting this generated data to the analysis instrument, determinations being made about this data (e.g., whether the rotatable element has been rotated the predetermined amount) and the analysis instrument adjusting the valve drive mechanism based, at least in part, on this data.

In some such implementations, a testing technique may be performed which may include a test cartridge being inserted into and positioned within the analysis instrument, a mechanism of the analysis instrument actuating a sensor on the test cartridge, that sensor generating data during the actuation by the analysis instrument, and the test cartridge transmitting that generated data to the analysis instrument. The analysis instrument may adjust, based on that generated data, the mechanism. The analysis instrument may also, in some implementations, determine whether the sensor data indicates that an element of the sensors is outside of a threshold; the analysis instrument may then makes its adjustment of the mechanism based on that determination.

In some implementations, the test cartridge and/or analysis instrument may include a notification mechanism that may provide a notification with information relating to a result of the testing and/or data generated by one or more sensors of the test cartridge. The "notification" may be one or more of an alarm, alert, message, an auditory output, an electronic communication, an electromagnetic communication, and/or a visual output. The notification may indicate a warning or an error that one or more mechanisms of the analysis instrument are outside of predetermined thresholds. The notification may also indicate that one or more mechanisms of the analysis instrument are within the predetermined thresholds. The notification may be based, at least in part, on the data generated by the one or more sensors of the test cartridge, including any and all of the movement data, determinations, and assessments described herein.

Notifications may be provided through a variety of media, and may, in some cases, require further action by an intermediate device before being perceptible by a user. For example, the notification mechanism may include a display or lights that are to display graphics or light up in order to catch the attention of a person (the notification, in this case, may refer to a signal that is sent to the lights or display that cause these components to light up or display graphics to a person; it may also refer to the light or graphics that is emitted or displayed by components receiving the signal in response to the signal). In some other or additional examples, the notification mechanism may include a wireless interface and the notification may take the form of an electronic or electromagnetic communication, e.g., a wireless signal, that is sent to another device, e.g., the analysis unit, a computer, or a smartphone, associated with a person (the notification in this case may be an electromagnetic signal; it may also refer to any audio, visual, tactile, or other output generated by the receiving device in response to receipt of the signal). The notification mechanism may be configured to generate and/or provide one or more notifications to the user, and may include one or more components that may be used to generate audio, visual, electromagnetic, or other types of notifications.

The test cartridges described herein provide numerous advantages and benefits. For instance, they provide improved ease of performing diagnostics of an analysis instrument. By inserting such test cartridges into such analysis instruments, numerous subsystems of the analysis instruments may be sequentially or simultaneously tested in order to assess whether any such subsystems are malfunctioning and, if so, which ones and in what manner. This allows potential issues with an analysis instrument's analysis cartridge handling systems to be diagnosed without any disassembly of the analysis instrument itself.

The test cartridges may be used for an initial calibration or quality control of an analysis instrument. In some such implementations, the test cartridges may be inserted into the analysis instrument and the actuation mechanisms of the analysis instrument may engage with the test cartridge and cause one or more of the analysis cartridge's sensors to generate data when actuated by the analysis instrument, as described herein. This generated data may be stored in the analysis instrument and/or the test cartridge, and used to assess whether each of the analysis unit's actuation mechanisms are within predetermined thresholds. The assessment may be performed by the analysis unit and/or the test cartridge, and the assessment may take the form of the notification (e.g., a message or light) that indicates whether each of the analysis unit's actuation mechanisms are, or are not, within one or more predetermined thresholds. Corrective action, such as adjustments or repairs, may be made to the analysis unit to address the actuation mechanisms that are outside the predetermined thresholds.

This generated data may also be used to determine baseline measurements of the analysis instrument's actuation mechanisms that can be used in comparison with subsequently acquired generated data of that same analysis instrument to detect issues with the analysis instrument. For example, the test cartridge may generate data of the analysis instrument's actuation mechanisms immediately after manufacturing and before use in the field. After a period of time or a number of uses after this initial data is generated, for instance, the test cartridge may again be inserted into the analysis instrument and the actuation mechanisms of the analysis instrument may again engage with the test cartridge and cause one or more of the analysis cartridge's sensors to generate data when actuated by the analysis instrument. This subsequently generated data may be compared with the originally generated data, or some previously generated data, to determine whether the analysis unit's actuation mechanisms are still operating as they were initially or as previously measures, e.g., whether each of the analysis unit's actuation mechanisms are still operating within the predetermined thresholds. In some implementations, the originally generated data may be used to recalibrate the analysis unit by readjusting the analysis unit so that its actuation mechanisms match the originally or previously generated data. This may enable the test cartridges to be used for field diagnostics in order to detect issues with analysis instruments as well as recalibrating stored values based on outputted data from the test cartridge.

It should be understood that the above disclosure covers the following list of implementations. It should also be understood that this list is not a limiting or exhaustive list of various implementations covered by this disclosure.

Implementation 1: A test cartridge for insertion into an analysis instrument having a linear actuation mechanism, a rotational actuation mechanism, a heater, a pump actuation mechanism, a second linear actuation mechanism, and a cartridge receiver, the test cartridge comprising: a test cartridge housing having a form factor to be received by the cartridge receiver of the analysis instrument; a plurality of first linear translation sensors, each first linear translation sensor having first detector and a corresponding first movable element linearly translatable along a first axis, wherein at least a first portion of each of the plurality of first linear translation sensors is positioned within the test cartridge housing such that the corresponding first movable element thereof is to engage with the linear actuation mechanism of the analysis instrument when the test cartridge is inserted into the analysis instrument and the linear actuation mechanism of the analysis instrument is actuated, and wherein each first detector of each of the plurality of first linear translation sensors is to detect a first distance moved by the corresponding first movable element along the first axis relative to the test cartridge housing responsive to a linear input provided by the linear actuation mechanism of the analysis instrument when the test cartridge is inserted into the analysis instrument and the linear actuation mechanism of the analysis instrument is actuated; a second linear translation sensor having a second detector and a second movable element linearly translatable along a second axis, wherein at least a second portion of the second linear translation sensor is positioned within the test cartridge housing such that the second movable element is to engage with the pump actuation mechanism of the analysis instrument when the test cartridge is inserted into the analysis instrument and the pump actuation mechanism of the analysis instrument is actuated, and wherein the second detector is to detect a second distance moved by the second movable element along the second axis relative to the test cartridge housing when the test cartridge is inserted into the analysis instrument and the pump actuation mechanism of the analysis instrument is actuated; an angular rotation sensor having a third detector and a rotatable element rotatable about a third axis, wherein the angular rotation sensor is positioned within the test cartridge housing such that the rotatable element is to engage with the rotational actuation mechanism of the analysis instrument when the test cartridge is inserted into the analysis instrument and the rotational actuation mechanism of the analysis instrument is actuated, and wherein the third detector is to detect an angle moved by the rotatable element about the third axis relative to the test cartridge housing when the test cartridge is inserted into the analysis instrument and the rotational actuation mechanism of the analysis instrument is actuated; a temperature sensor having a receptacle in the test cartridge housing and a temperature detector positioned within the receptacle, wherein the temperature sensor is positioned within the test cartridge housing such that the receptacle is to engage with the heater of the analysis instrument when the test cartridge is inserted into the analysis instrument, and wherein the temperature detector is to detect a temperature inside the receptacle when the test cartridge is inserted into the analysis instrument; and a plurality of load cells, each of the plurality of load cells is positioned within the test cartridge housing such that each load cell is to engage with a the second linear actuation mechanism when the test cartridge is inserted into the analysis instrument and the second linear actuation mechanism of the analysis instrument is actuated, and wherein each of the plurality of load cells is to detect a force applied to the respective load cell when the test cartridge is inserted into the analysis instrument and the second linear actuation mechanism of the analysis instrument is actuated.

Implementation 2: The test cartridge of implementation 1, further comprising a controller having one or more processors and one or more memory devices, wherein: the controller is communicatively connected with each first detector each of the plurality of first linear translation sensors, the second detector of the second linear translation sensor, the third detector of the angular rotation sensor, the temperature detector of the temperature sensor, and each of the plurality of load cells, and the controller is to receive and store data generated by each first detector, the second detector, the third detector, the temperature sensor, and each of the plurality of load cells.

Implementation 3: The test cartridge of any of implementations 1 through 2, wherein: the controller is to cause the transmission of updated movement data to the analysis instrument, and the updated movement data is based, at least in part, on one or more of data generated by one or more of the first detectors, the second detector, the third detector, the temperature sensor, and each of the plurality of load cells.

Implementation 4: The test cartridge of any of implementations 1 through 3, wherein: the controller is to cause the transmission of the data generated by the first detectors, the second detector, the third detector, the temperature sensor, and each of the plurality of load cells to the analysis instrument, and the analysis instrument is to issue a notification based, at least in part, on the data generated by the first detectors, the second detector, the third detector, the temperature sensor, and each of the plurality of load cells.

Implementation 5: The test cartridge of any of implementations 1 through 4, further comprising a communications interface to transmit data generated by each of the plurality of first linear translation sensors, the second linear translation sensor, the angular rotation sensor, the temperature sensor, and the plurality of load cells to an external device.

Implementation 6: The test cartridge of any of implementations 1 through 5, wherein the external device is the analysis instrument.

Implementation 7: The test cartridge of any of implementations 1 through 6, wherein: each of the plurality of first linear translation sensors further includes a first resistive element to apply a first resistive force against the first movable element along the first axis, and the angular rotation sensor further includes a second resistive element to apply a second resistive force against the rotatable element.

Implementation 8: The test cartridge of any of implementations 1 through 7, wherein: the angular rotation sensor further includes a friction element to contact and apply a frictional resistance force against the rotatable element, the angular rotation sensor further includes a resistive element positioned such that the friction element is interposed between the resistive element and the rotatable element, and the resistive element is to apply a force to the friction element along the third axis and in a direction towards the rotatable element.

Implementation 9: The test cartridge of any of implementations 1 through 8, further comprising a second angular rotation sensor having a second angular detector and a second rotatable element rotatable about a second rotation axis, wherein the second angular rotation sensor is positioned such that the second rotatable element is to engage with the rotational actuation mechanism of the analysis instrument when the test cartridge is inserted into the analysis instrument and the pump actuation mechanism of the analysis instrument is actuated, and wherein the second angular detector is to detect a second angle moved by the second rotatable element about the second rotation axis relative to the test cartridge housing when the test cartridge is inserted into the analysis instrument and the pump actuation mechanism of the analysis instrument is actuated.

Implementation 10: A test cartridge for insertion into an analysis instrument having a linear actuation mechanism and a cartridge receiver, the test cartridge comprising: a test cartridge housing having a form factor to be received by the cartridge receiver of the analysis instrument; and a plurality of linear translation sensors, each of the linear translation sensors having a first detector and a corresponding first movable element linearly translatable along a first axis, wherein at least a portion of each of the linear translation sensors is positioned within the test cartridge housing of the test cartridge such that the corresponding first movable element thereof is to engage with the linear actuation mechanism of the analysis instrument when the test cartridge is inserted into the analysis instrument and the linear actuation mechanism of the analysis instrument is actuated, and each detector is to detect a distance moved by the corresponding first movable element along the corresponding first axis relative to the test cartridge housing when the test cartridge is inserted into the analysis instrument and the linear actuation mechanism of the analysis instrument is actuated.

Implementation 11: The test cartridge of implementation 10, wherein each linear translation sensor further includes a resistive element to apply a resistive force against the first movable element along the first axis in a first direction.

Implementation 12: The test cartridge of any of implementations 10 through 11, wherein the resistive element is a compression spring.

Implementation 13: The test cartridge of any of implementations 10 through 12, wherein each linear translation sensor further includes a contact portion to be contacted by an engagement pin of the linear actuation mechanism.

Implementation 14: The test cartridge of any of implementations 10 through 13, wherein: each movable element includes an encoder strip, and each detector is an optical sensor to detect a movement of the encoder strip included in the corresponding movable element.

Implementation 15: The test cartridge of any of implementations 10 through 14, further comprising a controller having one or more processors and one or more memory devices, wherein: the controller is communicatively connected with each first detector of each of the linear translation sensors, and the controller is to receive and store data generated by each first detector of each of the linear translation sensors.

Implementation 16: The test cartridge of any of implementations 10 through 15, further comprising a communications interface to transmit data generated by each of the one or more first linear translation sensors.

Implementation 17: The test cartridge of any of implementations 10 through 16, wherein: the communications interface is to transmit data generated by each of the one or more first linear translation sensors to the analysis instrument, the controller is to cause the transmission of calibration data to the analysis instrument, and the calibration data is based, at least in part, data generated by one or more first linear translation sensors of the analysis instrument.

Implementation 18: A test cartridge for insertion into an analysis instrument having a pump actuation mechanism and a cartridge receiver, the test cartridge comprising: a test cartridge housing having a form factor to be received by the cartridge receiver of the analysis instrument, a first hole and a second hole opposite the first hole, the second hole to receive a portion of the pump actuation mechanism of the analysis instrument; and a linear translation sensor having a detector and a movable element linearly translatable along a first axis, wherein at least a portion of the movable element is positioned within the test cartridge housing of the test cartridge, the movable element is positioned in between the first hole and the second hole, the movable element is to engage with and is movable by the portion of the pump actuation mechanism inserted through the second hole when the test cartridge is inserted into the analysis instrument and the pump actuation mechanism of the analysis instrument is actuated and, while being moved by the pump actuation mechanism when the test cartridge is inserted into the analysis instrument and the pump actuation mechanism of the analysis instrument is actuated, the movable element is movable through the first hole, and the detector is to detect a distance moved by the movable element along the first axis relative to the test cartridge housing.

Implementation 19: The test cartridge of implementation 18, further comprising a controller having one or more processors and one or more memory devices, wherein: the controller is communicatively connected with the detector of the linear translation sensor, and the controller is to receive and store data generated by the detector of the linear translation sensor.

Implementation 20: The test cartridge of any of implementations 18 through 19, further comprising a communications interface to transmit data generated by the linear translation sensor.

Implementation 21: A test cartridge for insertion into an analysis instrument having a rotational actuation mechanism, a heater, and a cartridge receiver, the test cartridge comprising: a test cartridge housing having a form factor to be received by the cartridge receiver of the analysis instrument and a port to receive the heater of the analysis instrument; a first angular rotation sensor having a first detector and a first rotatable element rotatable about a first rotation axis, the first angular rotation sensor is positioned within the test cartridge housing such that the first rotatable element is to engage with the rotational actuation mechanism of the analysis instrument when the test cartridge is inserted into the analysis instrument and the rotational actuation mechanism of the analysis instrument is actuated, and wherein the first detector is to detect a first angle moved by the first rotatable element about the first rotation axis relative to the test cartridge housing when the test cartridge is inserted into the analysis instrument and the rotational actuation mechanism of the analysis instrument is actuated; and a temperature sensor having a receptacle in the test cartridge housing and a temperature detector positioned within the receptacle, wherein the temperature sensor is positioned within the test cartridge housing such that the receptacle is to engage with the heater of the analysis instrument when the test cartridge is inserted into the analysis instrument, wherein the receptacle is to be heated by the heater of the analysis instrument, and wherein the temperature detector is to detect a temperature inside the receptacle.

Implementation 22: The test cartridge of implementation 21, further comprising a second angular rotation sensor having a second detector and a second rotatable element rotatable about a second rotation axis, wherein the second angular rotation sensor is positioned within the test cartridge housing such that the second rotatable element is to engage with the rotational actuation mechanism of the analysis instrument when the test cartridge is inserted into the analysis instrument and the rotational actuation mechanism of the analysis instrument is actuated, and wherein the second detector is to detect a second angle moved by the second rotatable element about the second rotation axis relative to the test cartridge housing when the test cartridge is inserted into the analysis instrument and the rotational actuation mechanism of the analysis instrument is actuated.

Implementation 23: The test cartridge of any of implementations 21 through 22, wherein the first rotation axis and second rotation axis are parallel to each other.

Implementation 24: The test cartridge of any of implementations 21 through 23, wherein the rotatable element includes a shaft and features to engage with the rotational actuation mechanism of the analysis instrument.

Implementation 25: The test cartridge of any of implementations 21 through 24, the first angular rotation sensor further includes an encoder disk having a disk center axis that is collinear with a center axis of the rotatable element and the first axis, and the first detector is an optical sensor to detect a movement of encoder disk.

Implementation 26: The test cartridge of any of implementations 21 through 25, wherein the first angular rotation sensor further includes a resistive element to apply a resistive force against the rotatable element.

Implementation 27: The test cartridge of any of implementations 21 through 26, wherein the first angular rotation sensor further includes a friction element to contact and apply a frictional resistance force against the rotatable element.

Implementation 28: The test cartridge of any of implementations 21 through 27, wherein: the first angular rotation sensor further includes a resistive element positioned such that the friction element is interposed between the resistive element and the first rotatable element, and the resistive element is to apply a force to the friction element along the rotation axis in a direction towards the rotatable element.

Implementation 29: The test cartridge of any of implementations 21 through 28, wherein the receptacle is comprised of a metal.

Implementation 30: The test cartridge of any of implementations 21 through 29, wherein the receptacle is to be contacted by the heater inserted through the port.

Implementation 31: The test cartridge of any of implementations 21 through 30, wherein: the receptacle further includes a heating collar around the receptacle, and the heating collar is to be contacted by the heater inserted through the port.

Implementation 32: The test cartridge of any of implementations 21 through 31, further comprising a torque sensor to measure a torque applied to the rotatable element.

Implementation 33: The test cartridge of any of implementations 21 through 32, further comprising a controller having one or more processors and one or more memory devices, wherein: the controller is communicatively connected with the first detector and the temperature detector, and the controller is to receive and store data generated by the first detector and the temperature detector.

Implementation 34: The test cartridge of any of implementations 21 through 33, further comprising a communications interface to transmit data generated by the first angular rotation sensor and the temperature sensor.

Implementation 35: The test cartridge of any of implementations 21 through 34, wherein: the communications interface to transmit data generated by the first angular rotation sensor and the temperature sensor, the controller is to cause the transmission of data generated by the first angular rotation sensor and the temperature sensor to the analysis instrument, and the analysis instrument is to issue a notification based, at least in part, on data generated by one or more of the first angular rotation sensor and the temperature sensor.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

It is also to be understood that the use of "to," e.g., "the gas inlet of the cartridge is to receive a gas from the temperature control system," may be replaceable with language such as "configured to," e.g., "the gas inlet of the cartridge is configured to receive a gas from the temperature control system", or the like.

Terms such as "about," "approximately," "substantially," "nominal," or the like, when used in reference to quantities or similar quantifiable properties, are to be understood to be inclusive of values within ±10%, ±5%, ±3%, ±1%, ±0.5%, ±0.1%, ±0.05%, or ±0.01% of the values specified, unless otherwise indicated.

It is to be understood that the phrases "for each <item> of the one or more <items>," "each <item> of the one or more <items>," or the like, if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

It should be appreciated that all combinations of the foregoing concepts (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

While the concepts herein have been described with respect to the Figures, it will be appreciated that many modifications and changes may be made by those skilled in the art without departing from the spirit of the disclosure.

What is claimed is:

1. A test cartridge for insertion into an analysis instrument having a linear actuation mechanism, a rotational actuation mechanism, a heater, a pump actuation mechanism, a second linear actuation mechanism, and a cartridge receiver, the test cartridge comprising:
    a test cartridge housing having a form factor configured to be received by the cartridge receiver of the analysis instrument;
    a plurality of first linear translation sensors, each first linear translation sensor having a corresponding first detector and a corresponding first movable element linearly translatable along a corresponding first axis, wherein at least a first portion of each of the first linear translation sensors is positioned within the test cartridge housing such that the corresponding first movable element thereof is configured to engage with the linear actuation mechanism of the analysis instrument when the test cartridge is inserted into the analysis instrument and the linear actuation mechanism of the analysis instrument is actuated, and wherein the first detector of each of the first linear translation sensors is configured to detect a first distance moved by the corresponding first movable element along the corresponding first axis relative to the test cartridge housing and responsive to a linear input provided by the linear actuation mechanism of the analysis instrument when the test cartridge is inserted into the analysis instrument and the linear actuation mechanism of the analysis instrument is actuated;
    a second linear translation sensor having a second detector and a second movable element linearly translatable along a second axis, wherein at least a second portion of the second linear translation sensor is positioned within the test cartridge housing such that the second movable element is configured to engage with the pump actuation mechanism of the analysis instrument when the test cartridge is inserted into the analysis instrument and the pump actuation mechanism of the analysis instrument is actuated, and wherein the second detector is configured to detect a second distance moved by the second movable element along the second axis relative to the test cartridge housing when the test cartridge is inserted into the analysis instrument and the pump actuation mechanism of the analysis instrument is actuated;
    an angular rotation sensor having a third detector and a rotatable element rotatable about a third axis, wherein the angular rotation sensor is positioned within the test cartridge housing such that the rotatable element is configured to engage with the rotational actuation mechanism of the analysis instrument when the test cartridge is inserted into the analysis instrument and the rotational actuation mechanism of the analysis instrument is actuated, and wherein the third detector is configured to detect an angle moved by the rotatable element about the third axis relative to the test cartridge housing when the test cartridge is inserted into the analysis instrument and the rotational actuation mechanism of the analysis instrument is actuated;

a temperature sensor having a receptacle in the test cartridge housing and a temperature detector positioned within the receptacle, wherein the temperature sensor is positioned within the test cartridge housing such that the receptacle is configured to engage with the heater of the analysis instrument when the test cartridge is inserted into the analysis instrument, and wherein the temperature detector is configured to detect a temperature inside the receptacle when the test cartridge is inserted into the analysis instrument; and a plurality of load cells, wherein each of the load cells is positioned within the test cartridge housing such that each load cell is configured to engage with the second linear actuation mechanism of the analysis instrument when the test cartridge is inserted into the analysis instrument and the second linear actuation mechanism of the analysis instrument is actuated, and wherein each of the load cells is configured to detect a force applied to the respective load cell when the test cartridge is inserted into the analysis instrument and the second linear actuation mechanism of the analysis instrument is actuated.

2. The test cartridge of claim 1, further comprising a controller having one or more processors and one or more memory devices, wherein:

the controller is communicatively connected with the first detector of each first linear translation sensor, the second detector of the second linear translation sensor, the third detector of the angular rotation sensor, the temperature detector of the temperature sensor, and each of the load cell, and the controller is configured to receive and store data generated by each first detector, the second detector, the third detector, the temperature sensor, and each of the load cells.

3. The test cartridge of claim 2, wherein:

the controller is configured to cause the transmission of updated movement data to the analysis instrument, and the updated movement data is based, at least in part, on one or more of data generated by one or more of the first detectors, the second detector, the third detector, the temperature sensor, and each of the load cells.

4. The test cartridge of claim 2, wherein:

the controller is configured to cause the transmission of the data generated by the first detectors, the second detector, the third detector, the temperature sensor, and each of the load cells to the analysis instrument, and the analysis instrument is configured to issue a notification based, at least in part, on the data generated by the first detectors, the second detector, the third detector, the temperature sensor, and each of the load cells.

5. The test cartridge of claim 1, further comprising a communications interface configured to transmit data generated by each of the first linear translation sensors, the second linear translation sensor, the angular rotation sensor, the temperature sensor, and the load cells to an external device.

6. The test cartridge of claim 1 wherein:

each of the first linear translation sensors further includes a corresponding first resistive element configured to apply a first resistive force against the corresponding first movable element of that first linear translation sensor along the corresponding first axis of that first linear translation sensor, and the angular rotation sensor further includes a second resistive element configured to apply a second resistive force against the rotatable element.

7. The test cartridge of claim 1, wherein:

the angular rotation sensor further includes a friction element configured to contact and apply a frictional resistance force against the rotatable element, the angular rotation sensor further includes a resistive element positioned such that the friction element is interposed between the resistive element and the rotatable element, and the resistive element is configured to apply a force to the friction element along the third axis and in a direction towards the rotatable element.

8. The test cartridge of claim 1, further comprising a second angular rotation sensor having a second angular detector and a second rotatable element rotatable about a second rotation axis, wherein the second angular rotation sensor is positioned such that the second rotatable element is configured to engage with a second rotational actuation mechanism of the analysis instrument when the test cartridge is inserted into the analysis instrument and the second rotational actuation mechanism of the analysis instrument is actuated, and wherein the second angular detector is configured to detect a second angle moved by the second rotatable element about the second rotation axis relative to the test cartridge housing when the test cartridge is inserted into the analysis instrument and the second rotational actuation mechanism of the analysis instrument is actuated.

9. A test cartridge for insertion into an analysis instrument having a linear actuation mechanism and a cartridge receiver, the test cartridge comprising:

a test cartridge housing having a form factor configured to be received by the cartridge receiver of the analysis instrument; and a plurality of linear translation sensors, each of the linear translation sensors having a corresponding first detector and a corresponding first movable element linearly translatable along a corresponding first axis, wherein at least a portion of each of the linear translation sensors is positioned within the test cartridge housing of the test cartridge such that the corresponding first movable element thereof is configured to engage with the linear actuation mechanism of the analysis instrument when the test cartridge is inserted into the analysis instrument and the linear actuation mechanism of the analysis instrument is actuated, and each first detector is configured to detect a distance moved by the corresponding first movable element along the corresponding first axis relative to the test cartridge housing when the test cartridge is inserted into the analysis instrument and the linear actuation mechanism of the analysis instrument is actuated.

10. The test cartridge of claim 9, wherein each linear translation sensor further includes a corresponding contact portion configured to be contacted by an engagement pin of the linear actuation mechanism.

11. The test cartridge of claim 9, wherein:
each first movable element includes an encoder strip, and
each first detector is an optical sensor configured to detect a movement of the encoder strip included in the corresponding first movable element.

12. The test cartridge of claim 9, further comprising a controller having one or more processors and one or more memory devices, wherein:
the controller is communicatively connected with each of the first detectors, and
the controller is configured to receive and store data generated by the first detectors.

13. The test cartridge of claim 12, further comprising a communications interface to transmit data generated by each of the linear translation sensors, wherein:
the communications interface is configured to transmit data generated by each of the linear translation sensors to the analysis instrument,
the controller is configured to cause the transmission of calibration data to the analysis instrument, and
the calibration data is based, at least in part, data generated by one or more linear translation sensors.

14. A test cartridge for insertion into an analysis instrument having a rotational actuation mechanism, a heater, and a cartridge receiver, the test cartridge comprising:
a test cartridge housing having a form factor configured to be received by the cartridge receiver of the analysis instrument and a port configured to receive the heater of the analysis instrument;
a first angular rotation sensor having a first detector and a first rotatable element rotatable about a first rotation axis, wherein the first angular rotation sensor is positioned within the test cartridge housing such that the first rotatable element is configured to engage with the rotational actuation mechanism of the analysis instrument when the test cartridge is inserted into the analysis instrument and the rotational actuation mechanism of the analysis instrument is actuated, and wherein the first detector is configured to detect a first angle moved by the first rotatable element about the first rotation axis relative to the test cartridge housing when the test cartridge is inserted into the analysis instrument and the rotational actuation mechanism of the analysis instrument is actuated; and
a temperature sensor having a receptacle in the test cartridge housing and a temperature detector positioned within the receptacle, wherein the temperature sensor is positioned within the test cartridge housing such that the receptacle is configured to engage with the heater of the analysis instrument when the test cartridge is inserted into the analysis instrument, wherein the receptacle is configured to be heated by the heater of the analysis instrument, and wherein the temperature detector is configured to detect a temperature inside the receptacle.

15. The test cartridge of claim 14, wherein the first rotatable element includes a shaft and features configured to engage with the rotational actuation mechanism of the analysis instrument.

16. The test cartridge of claim 14, wherein:
the first angular rotation sensor further includes an encoder disk having a disk center axis that is collinear with a center axis of the first rotatable element and the first axis, and
the first detector is an optical sensor configured to detect a movement of encoder disk.

17. The test cartridge of claim 14, wherein the receptacle is configured to be contacted by the heater of the analysis instrument when the test cartridge is inserted into the analysis instrument and the heater is inserted through the port.

18. The test cartridge of claim 14, further comprising a torque sensor configured to measure a torque applied to the rotatable element.

19. The test cartridge of claim 14, further comprising a controller having one or more processors and one or more memory devices, wherein:
the controller is communicatively connected with the first detector and the temperature detector, and
the controller is configured to receive and store data generated by the first detector and the temperature detector.

20. The test cartridge of claim 19, further comprising a communications interface, wherein:
the communications interface is configured to transmit data generated by the first angular rotation sensor and the temperature sensor,
the controller is configured to cause the transmission of data generated by the first angular rotation sensor and the temperature sensor to the analysis instrument, and
the analysis instrument is configured to issue a notification based, at least in part, on data generated by one or more of the first angular rotation sensor and the temperature sensor.

21. The test cartridge of claim 5, wherein the external device is the analysis instrument.

22. The test cartridge of claim 9, wherein each linear translation sensor further includes a resistive element configured to apply a resistive force against the corresponding first movable element along the corresponding first axis and in a corresponding first direction.

23. The test cartridge of claim 22, wherein the resistive element is a compression spring.

24. A test cartridge for insertion into an analysis instrument having a pump actuation mechanism and a cartridge receiver, the test cartridge comprising:
a test cartridge housing having a form factor configured to be received by the cartridge receiver of the analysis instrument, wherein the test cartridge includes a first hole and a second hole opposite the first hole, and the second hole is configured to receive a portion of the pump actuation mechanism of the analysis instrument; and
a linear translation sensor having a detector and a movable element linearly translatable along a first axis, wherein:
at least a portion of the movable element is positioned within the test cartridge housing of the test cartridge,
the movable element is positioned in between the first hole and the second hole,
the movable element is configured to engage with and is movable by the portion of the pump actuation mechanism received by the second hole when the test cartridge is inserted into the analysis instrument and the pump actuation mechanism of the analysis instrument is actuated,
the movable element is configured to be movable through the first hole when the test cartridge is inserted into the analysis instrument and the pump actuation mechanism of the analysis instrument is actuated to move the movable element, and the detector is configured to detect a distance moved by the movable element along the first axis relative to the test cartridge housing.

25. The test cartridge of claim 24, further comprising a controller having one or more processors and one or more memory devices, wherein:
the controller is communicatively connected with the detector of the linear translation sensor, and
the controller is configured to receive and store data generated by the detector of the linear translation sensor.

26. The test cartridge of claim 24, further comprising a communications interface configured to transmit data generated by the linear translation sensor.

27. The test cartridge of claim 14, further comprising a second angular rotation sensor having a second detector and a second rotatable element rotatable about a second rotation axis, wherein the second angular rotation sensor is positioned within the test cartridge housing such that the second rotatable element is configured to engage with a second rotational actuation mechanism of the analysis instrument when the test cartridge is inserted into the analysis instrument and the second rotational actuation mechanism of the analysis instrument is actuated, and wherein the second detector is configured to detect a second angle moved by the second rotatable element about the second rotation axis relative to the test cartridge housing when the test cartridge is inserted into the analysis instrument and the second rotational actuation mechanism of the analysis instrument is actuated.

28. The test cartridge of claim 27, wherein the first rotation axis and second rotation axis are parallel to each other.

29. The test cartridge of claim 14, wherein the first angular rotation sensor further includes a resistive element configured to apply a resistive force against the first rotatable element.

30. The test cartridge of claim 14, wherein the first angular rotation sensor further includes a friction element configured to contact and apply a frictional resistance force against the first rotatable element.

31. The test cartridge of claim 30, wherein:
the first angular rotation sensor further includes a resistive element positioned such that the friction element is interposed between the resistive element and the first rotatable element, and
the resistive element is configured to apply a force to the friction element along the rotation axis in a direction towards the first rotatable element.

32. The test cartridge of claim 14, wherein the receptacle is comprised of a metal.

33. The test cartridge of claim 17, wherein:
the receptacle further includes a heating collar around the receptacle, and
the heating collar is configured to be contacted by the heater of the analysis instrument when the test cartridge is inserted into the analysis instrument and the heater is inserted through the port.

* * * * *